(12) United States Patent
Barbis et al.

(10) Patent No.: US 11,564,006 B2
(45) Date of Patent: Jan. 24, 2023

(54) LEVITATING METERING APPARATUS

(71) Applicant: The Nielsen Company (US), LLC, New York, NY (US)

(72) Inventors: Andrej Barbis, Illirska Bistrica (SI); Joze Arh, Koper (SI); Marko Panger, Plavje (SI); Marko Usaj, Ljubljana (SI); Saso Vranek, Ilirska Bistrica (SI)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/452,542

(22) Filed: Oct. 27, 2021

(65) Prior Publication Data
US 2022/0053237 A1    Feb. 17, 2022

Related U.S. Application Data

(63) Continuation of application No. PCT/US2020/049898, filed on Sep. 9, 2019, and a
(Continued)

(51) Int. Cl.
*H04N 21/442*  (2011.01)
*G06Q 30/02*   (2012.01)
(Continued)

(52) U.S. Cl.
CPC ... *H04N 21/44213* (2013.01); *G06Q 30/0201* (2013.01); *G06Q 30/0242* (2013.01);
(Continued)

(58) Field of Classification Search
CPC ....... H04N 21/44213; H04N 21/42203; H04N 21/812; G06Q 30/0201; G06Q 30/0242;
(Continued)

(56) References Cited

U.S. PATENT DOCUMENTS 4,463,454 A   7/1984  Hemond et al.
5,396,136 A   3/1995  Pelrine
(Continued)

FOREIGN PATENT DOCUMENTS

KR   20040096867   11/2004
KR   20120036439   4/2012

OTHER PUBLICATIONS

International Searching Authority, "International Search Report," issued in connection with International Patent Application No. PCT/US2020/049898, dated Dec. 15, 2020, 5 pages.
(Continued)

*Primary Examiner* — Nathan J Flynn
*Assistant Examiner* — Christine A Kurien
(74) *Attorney, Agent, or Firm* — Hanley, Flight & Zimmerman, LLC

(57) ABSTRACT

Example levitating meter apparatus are disclosed. An example metering system includes a meter having a display to present indicia associated with a panelist. The meter has a microphone to receive audio output from a media device and circuitry to perform media monitoring. A base includes a cavity to receive at least a portion of the meter. The meter to magnetically levitate relative to the base to decouple the meter from the base. The base and the meter structured to fix a rotational position of the meter relative to the base when the at least the portion of the meter is received by the cavity of the base and the meter levitates relative to the base.

20 Claims, 17 Drawing Sheets

Related U.S. Application Data continuation of application No. 16/565,080, filed on Sep. 9, 2019, now Pat. No. 11,212,580.

(51) Int. Cl.
*H04H 60/33* (2008.01)
*H04N 21/422* (2011.01)
*H02N 15/00* (2006.01)
*H04N 21/81* (2011.01)

(52) U.S. Cl.
CPC ......... *G06Q 30/0272* (2013.01); *H02N 15/00* (2013.01); *H04H 60/33* (2013.01); *H04N 21/42203* (2013.01); *H04N 21/812* (2013.01); *H04H 2201/50* (2013.01)

(58) Field of Classification Search
CPC .... G06Q 30/0272; H02N 15/00; H04H 60/33; H04H 2201/50; H04H 60/31
See application file for complete search history.

(56) References Cited

U.S. PATENT DOCUMENTS

| | | | |
|---|---|---|---|
| 7,907,980 B2 * | 3/2011 | Cho | H04M 1/0237 455/575.4 |
| 9,336,935 B2 | 5/2016 | Michaelis | |
| 10,587,921 B2 * | 3/2020 | Cho | H04N 21/44204 |
| 10,623,695 B1 * | 4/2020 | Prasannavenkatesan | H04N 5/2251 |
| 2005/0084121 A1 | 4/2005 | Muren et al. | |
| 2015/0037128 A1 | 2/2015 | Kustler | |
| 2017/0331328 A1 | 11/2017 | Yang | |
| 2017/0374413 A1 | 12/2017 | Cooper et al. | |
| 2019/0261162 A1 | 8/2019 | Nielsen et al. | |
| 2021/0076097 A1 | 3/2021 | Barbis et al. | |

OTHER PUBLICATIONS

International Searching Authority, "Written Opinion," issued in connection with International Patent Application No. PCT/US2020/049898, dated Dec. 15, 2020, 6 pages.

United States Patent and Trademark Office, "Non-Final Office Action," issued in connection with U.S. Appl. No. 16/565,080, dated Oct. 9, 2020, 11 pages.

United States Patent and Trademark Office, "Final Office Action," issued in connection with U.S. Appl. No. 16/565,080, dated Apr. 16, 2021, 12 pages.

United States Patent and Trademark Office, "Notice of Allowance," issued in connection with U.S. Appl. No. 16/565,080, dated Aug. 20, 2021, 7 pages.

International Bureau, "International Preliminary Report on Patentability", issued in connection with International Patent Application No. PCT/US2020/049898 dated Mar. 9, 2022, 7 pages.

* cited by examiner

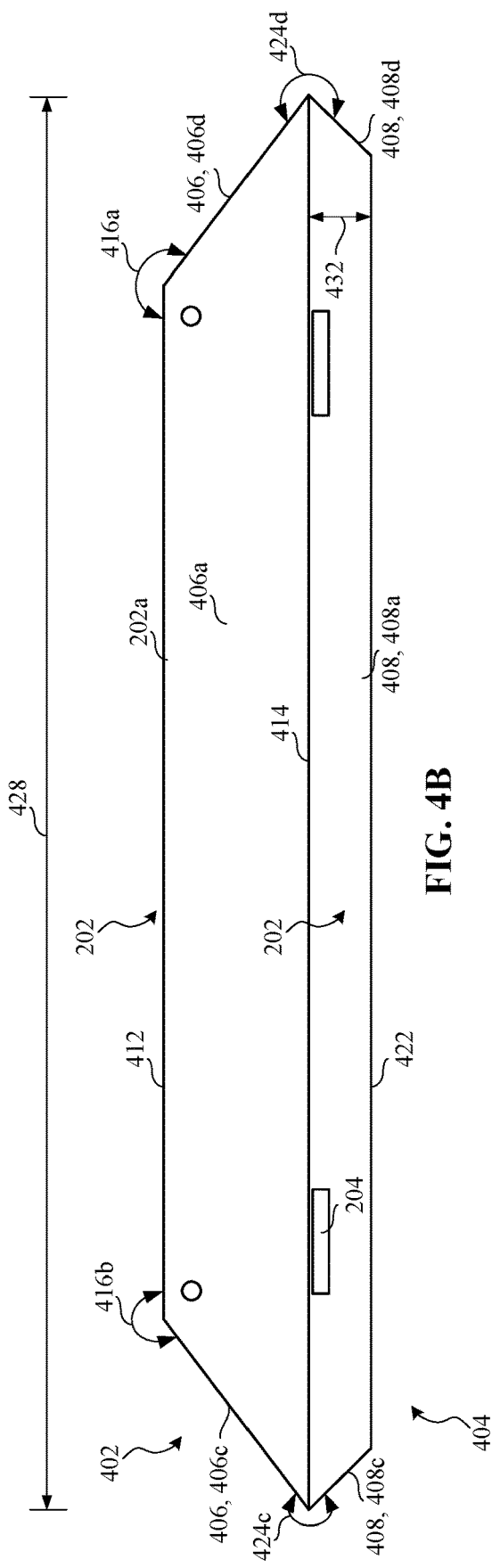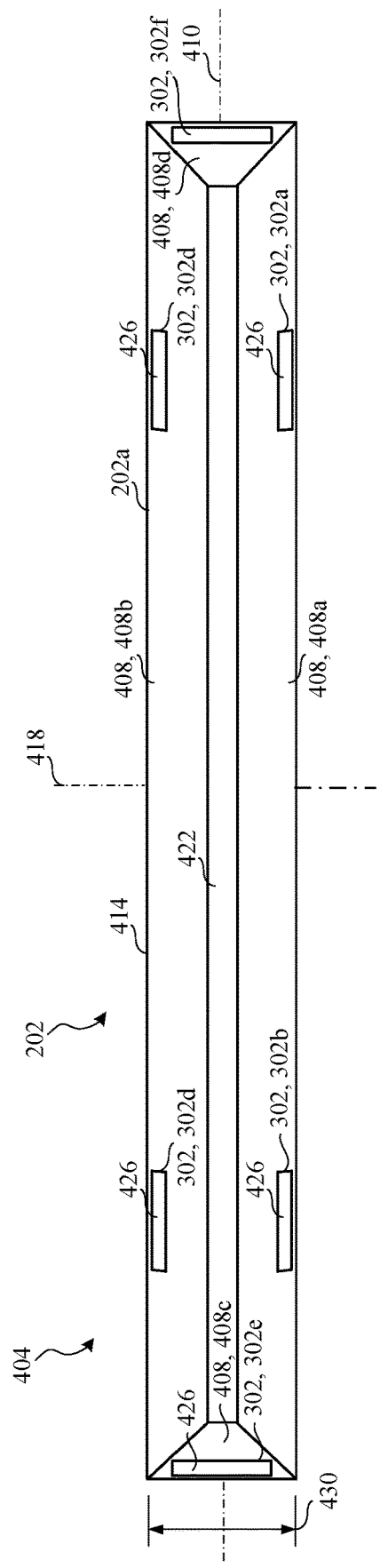
FIG. 4B
FIG. 4C

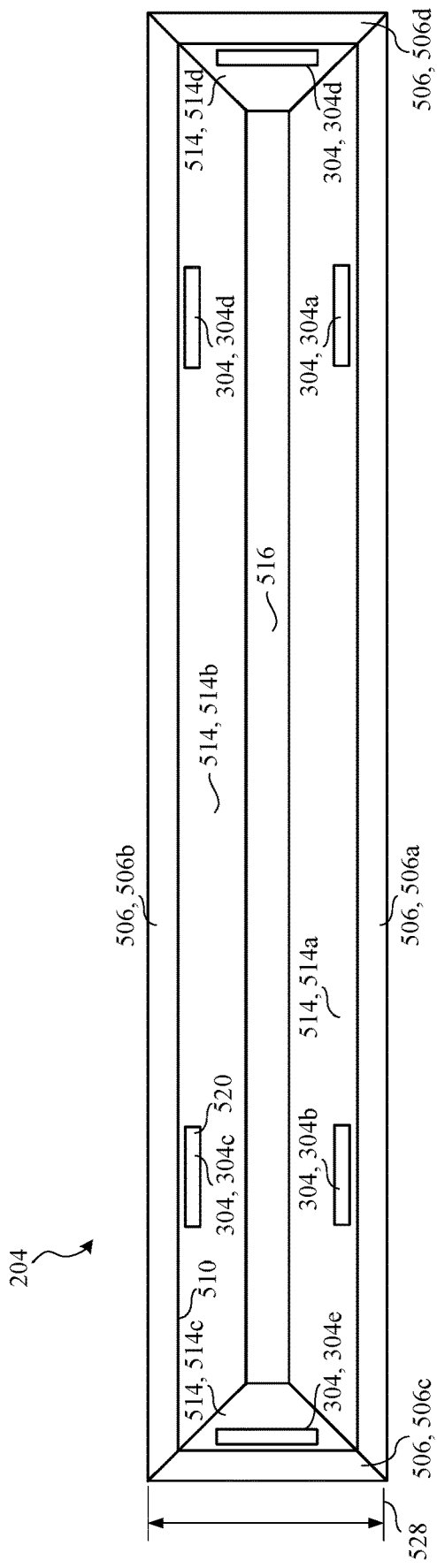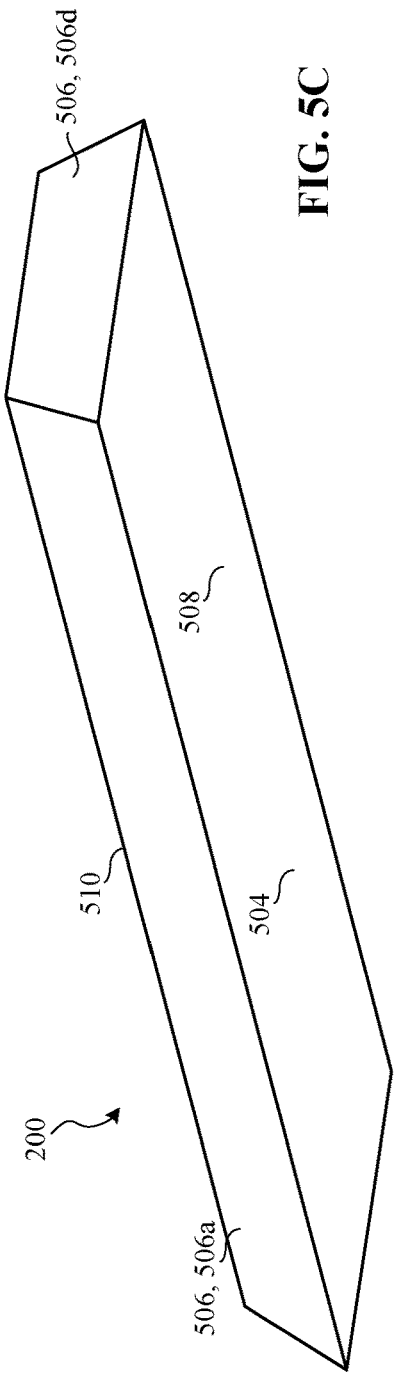
FIG. 5B
FIG. 5C

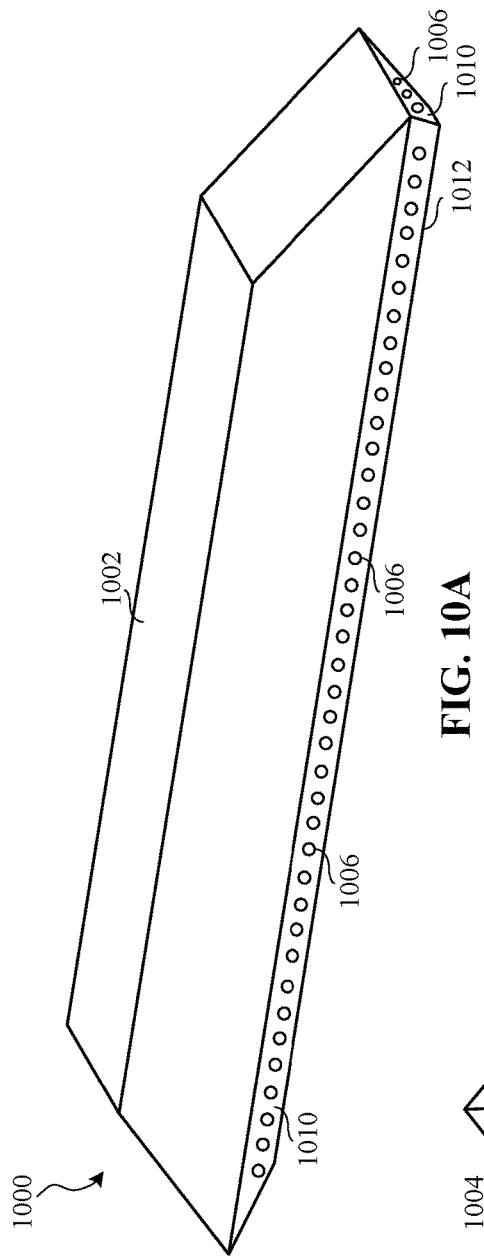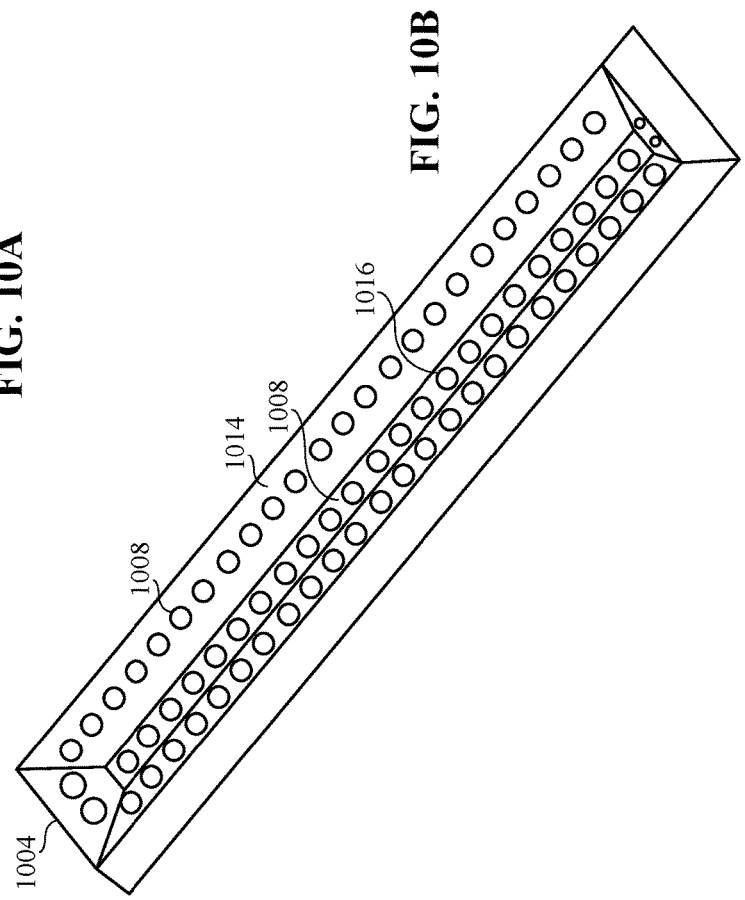

LEVITATING METERING APPARATUS

CROSS REFERENCE TO RELATED APPLICATION

This patent arises from a continuation of International Application No. PCT/US20/49898, filed Sep. 9, 2020, and from a continuation of U.S. patent application Ser. No. 16/565,080, filed Sep. 9, 2019. International Application No. PCT/US20/49898 also claims priority to U.S. patent application Ser. No. 16/565,080. All priorities to U.S. patent application Ser. No. 16/565,080 and International Application No. PCT/US20/49898 are hereby claimed. U.S. patent application Ser. No. 16/565,080 is hereby incorporated by reference herein in its entirety.

FIELD OF DISCLOSURE

This patent is directed to metering devices and, more specifically, to levitating metering apparatus.

BACKGROUND

Monitoring companies monitor user interaction with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

FIG. 4B is a front view of the example meter of FIG. 4A.

FIG. 4C is a bottom view of the example meter of FIGS. 4A and 4B.

FIG. 5B is a top view of the example base of FIG. 5A.

FIG. 5C is a perspective, bottom view of the example base of FIGS. 5A and 5B.

FIGS. 7-9, 10A and 10B illustrate other example metering systems 700-1000 disclosed herein.

Figure 1:
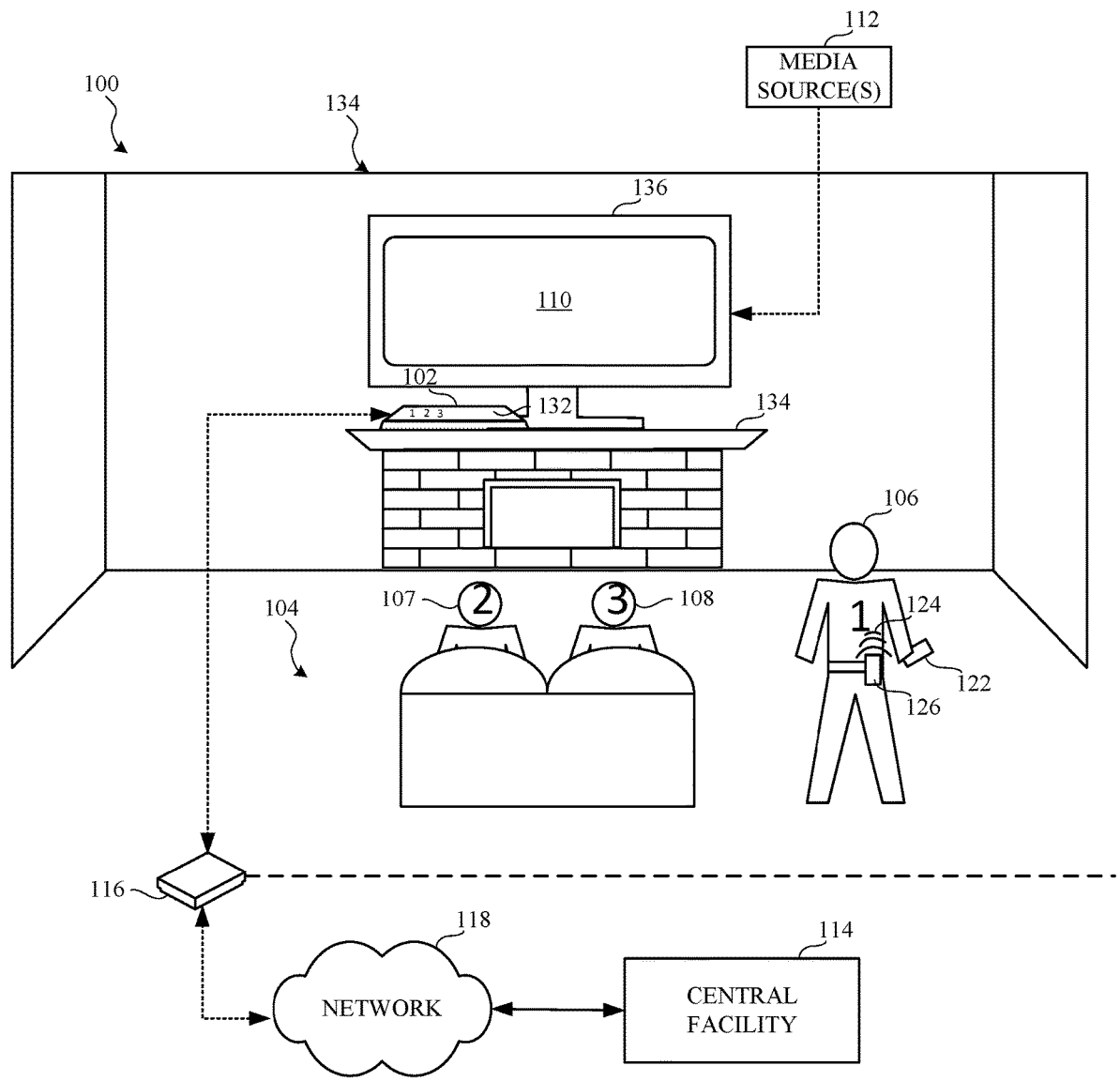
FIG. 1 illustrates an example audience measurement system with an example metering system constructed in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact or directly engaged with another part means that there is no intermediate part between the two parts.

DETAILED DESCRIPTION

Audience measurement entities (also referred to herein as "ratings entities" or "monitoring companies") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. For example, monitoring companies desire knowledge on how users interact with media devices, such as smartphones, tablets, laptops, smart televisions, etc. In particular, media monitoring companies monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus, media includes television programming or advertisements, radio programming or advertisements, movies, web sites, streaming media, etc.

To monitor media presentations made at a media device, metering devices often employ one or more microphones or other audio receiving devices. The one or more microphones receive audio signals of a media presentation presented by a media device. The audio signals are analyzed to enable the metering device to identify media presented by the media device.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Identification techniques based on both signature-based media monitoring and watermark-based media monitoring benefit from low levels of noise in the analyzed audio signals. To reduce noise received by the one or more microphones, some metering devices isolate individual microphones in a housing of the metering device. However, to isolate the individual microphones requires individual microphones to be removed from a main printed circuit board (e.g., a main PCB) of the metering device. Removing the individual microphones from the main printed circuit board and isolating each individual microphone in a housing of the metering device complicates manufacturing and adds significant costs to the metering device.

Example metering devices are disclosed herein monitor media presented by media devices. The example metering devices disclosed herein receive audio signals (e.g., that include audio signatures) to identify media content presented by a media device. To receive the audio signals, example metering devices disclosed herein employ one or more microphones or other audio receiving or identification devices. For example, metering devices disclosed herein employ one or more microphones coupled to a main printed circuit board (e.g., a main PBC) of the metering device. To prevent degradation of the audio signal due to noise or vibrations, the one or more microphones of the example metering devices disclosed herein are isolated from a base of the metering device, a media presentation device, and/or a stand on which the metering device and/or the presentation device is supported. To isolate the one or more microphones, the metering devices disclosed herein suspend or levitate a housing (e.g., including the one or more microphones) relative to a base of the metering device. To levitate the housing, example metering devices disclosed herein employ a housing a having a first plurality of magnets and a base having a second plurality of magnets. To this end, the housing (e.g., an entire housing) levitates relative to the base such that the housing does not physically contact the base. In other words, the housing of the example metering devices disclosed herein is entirely detached from the base. Detaching the housing from the base provides an insulation layer (e.g., an air gap) between the housing and the base, which dampens noise or vibrations and/or prevents noise or vibrations from interfering with the one or more microphones of the example metering devices disclosed herein. Magnetically levitating the entire housing of the example metering devices improves audio quality and/or audio detection accuracy and significantly reduces costs compared to alternative metering devices that isolate individual microphones.

FIG. 1 is an illustration of an example audience measurement system 100 having an example metering system 102 constructed in accordance with the teachings of this disclosure to monitor an example media presentation environment 104. In the illustrated example of FIG. 1, the media presentation environment 104 includes panelists 106, 107, and 108, an example media device 110 that receives media from an example media source 112, and the metering system 102. The metering system 102 identifies the media presented by the media device 110 and reports media monitoring information to an example central facility 114 of an audience measurement entity via an example gateway 116 and an example network 118. The example metering system 102 of FIG. 1 sends media identification data and/or audience identification data to the central facility 114 periodically, a-periodically and/or upon request by the central facility 114.

The example gateway 116 of the illustrated example of FIG. 1 is a router that enables the metering system 102 and/or other devices in the media presentation environment (e.g., the media device 110) to communicate with the network 118 (e.g., the Internet.) In some examples, the example gateway 116 facilitates delivery of media from the media source 112 to the media device 110 via the Internet. In some examples, the example gateway 116 includes gateway functionality, such as modem capabilities. In some other examples, the example gateway 116 is implemented in two or more devices (e.g., a router, a modem, a switch, a firewall, etc.). The gateway 116 of the illustrated example may communicate with the network 118 via Ethernet, a digital subscriber line (DSL), a telephone line, a coaxial cable, a USB connection, a Bluetooth connection, any wireless connection, etc.

In some examples, the example gateway 116 hosts a Local Area Network (LAN) for the media presentation environment 104. In the illustrated example, the LAN is a wireless local area network (WLAN), and allows the metering system 102, the media device 110, etc. to transmit and/or receive data via the Internet. Alternatively, the gateway 116 may be coupled to such a LAN. In some examples, the gateway 116 may be implemented with the example metering system 102 disclosed herein. In some examples, the gateway 116 may not be provided. In some such examples, the metering system meter 102 may communicate with the central facility 114 via cellular communication (e.g., the metering system 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The central facility 114 of the illustrated example is implemented by one or more servers. The central facility 114 processes and stores data received from the metering system 102. For example, the example central facility 114 of FIG. 1 combines audience identification data and program identification data from multiple households to generate aggregated media monitoring information. The central facility 114 generates reports for advertisers, program producers and/or other interested parties based on the compiled statistical data. Such reports include extrapolations about the size and demographic composition of audiences of content, channels and/or advertisements based on the demographics and behavior of the monitored panelists.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 107 and 108 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 107 and 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household, the example media presentation environment 104 can additionally or alternatively be any other type(s) of environments such as, for example, a theater, a restaurant, a tavern, a retail location, an arena, etc.

In examples disclosed herein, an audience measurement entity provides the metering system 102 to the panelist 106, 107 and 108 (or household of panelists) such that the metering system 102 may be installed by the panelist 106, 107 and 108 by simply powering the metering system 102 and placing the metering system 102 in the media presentation environment 104 and/or near the media device 110 (e.g., near a television set). In some examples, more complex installation activities may be performed such as, for example, affixing the metering system 102 to the media device 110, electronically connecting the metering system 102 to the media device 110, etc.

To identify and/or confirm the presence of a panelist present in the media presentation environment 104, the metering system 102 of the illustrated example includes an example display 132. For example, the display 132 provides identification of the panelists 106, 107, 108 that are present in the media presentation environment 104. For example, in the illustrated example, the metering system 102 displays indicia or visual indicators (e.g., illuminated numerals 1, 2 and 3) identifying and/or confirming the presence of the first panelist 106, the second panelist 107 and the third panelist 108. In some examples, the household member or panelist can log in via an active log in or a passive log in. An active login, for example, employs a remote controller (e.g., an infrared remote controller) that provides feedback (e.g., via a display) to a household member or panelist confirming registration. A passive login, for example, employs a meter (e.g., the metering system 102) having image sensors that can detect and/or identify a household member or panelist (e.g., the panelist 106, 107, 108 in a media monitoring environment). In some examples, an automatic login system employs Bluetooth nodes (e.g., a wearable such as, for example, a watch, a people meter, etc.) that automatically detect and/or log in household member and/or panelist present in a media monitoring environment. For example, the meter 102 can include a Bluetooth antenna that can receive communication signals from Bluetooth nodes associated with household members or panelists. In some examples, login can be performed verbally via one or more microphones associated with the meter 102 and/or one or more devices (e.g., home entertainment or smart home devices such as, for example, Alexa, Apple home pod, etc.) communicatively coupled to an audience measurement system (e.g., the audience measurement system 100, the metering system 102, etc.).

In some examples, the metering system 102 may be configured to receive panelist information via an example input device 122 such as, for example, a remote control, An Apple iPad®, a cell phone, etc.). In such examples, the metering system 102 prompts the audience members to indicate their presence by pressing an appropriate input key on the input device 122. For example, the input device 122 can enable the audience member(s) (e.g., the panelists 106, 107 and 108 of FIG. 1) and/or an unregistered user (e.g., a visitor to a panelist household) to input information to the metering system 102 of FIG. 1. This information includes registration data to configure the metering system 102 and/or demographic data to identify the audience member(s). For example, the input device 122 may include a gender input interface, an age input interface, and a panelist identification input interface, etc.

The metering system 102 of the illustrated example may also determine times at which to prompt the audience members to enter information to the metering system 102. In some examples, the metering system 102 of FIG. 1 supports audio watermarking for people monitoring, which enables the metering system 102 to detect the presence of a panelist-identifying metering device in the vicinity (e.g., in the media presentation environment 104) of the media device 110. In some examples, the acoustic sensor of the metering system 102 can sense example audio output 124 (e.g., emitted) by an example panelist-identifying metering device 126, such as, for example, a wristband, a cell phone, etc., that is uniquely associated with a particular panelist. The audio output 124 by the example panelist-identifying metering device 126 may include, for example, one or more audio watermarks to facilitate identification of the panelist-identifying metering device 126 and/or the panelist 106 associated with the panelist-identifying metering device 126.

The example media device 110 of the illustrated example shown in FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 could be a personal computer such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

Although the media device 110 of the illustrated example is a television, the media device 110 can correspond to any type of audio, video and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107 and 108).

The media source 112 may be any type of media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example metering system 102 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the metering system 102 (e.g., a meter and/or a base of the metering system 102), by physically mailing a memory of the metering system 102, etc.

The metering system 102 of the illustrated example of FIG. 1 combines audience measurement data and people metering data. For example, audience measurement data is determined by monitoring media output by the media device 110 and/or other media presentation device(s), and audience identification data (also referred to as demographic data, people monitoring data, etc.) is determined from people monitoring data provided to the metering system 102. Thus, the example metering system 102 provides dual functionality of a content measurement meter to collect content measurement data and people meter to collect and/or associate demographic information corresponding to the collected audience measurement data.

For example, the meter collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the metering system 102 and/or the example audience measurement system 100 extracts and/or processes the collected media identifying information and/or data received by the metering system 102, which can be compared to reference data to perform source and/or content identification. Any other type(s) and/or number of media monitoring techniques can be supported by the metering system 102.

Depending on the type(s) of metering the metering system 102 is to perform, the metering system 102 can be physically coupled to the media device 110 or may be configured to capture signals emitted externally by the media device 110

(e.g., free field audio) such that direct physical coupling to the media device 110 is not required. For example, the metering system 102 of the illustrated example can employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the metering system 102 of the illustrated example employs audio watermarking techniques and/or signature based-metering techniques.

The metering system 102 of the illustrated example senses audio (e.g., acoustic signals or ambient audio) output (e.g., emitted) by the media device 110. For example, the metering system 102 processes signals obtained from the media device 110 to detect media and/or source identifying signals (e.g., audio watermarks) embedded in portion(s) (e.g., audio portions) of the media presented by the media device 110. To sense ambient audio output by the media device 110, the metering system 102 of the illustrated example includes an example acoustic sensor (e.g., a microphone of FIGS. 2A and 2B). In some examples, the metering system 102 can process audio signals and/or video signals to generate respective audio and/or video signatures from the media presented by the media device 110.

To generate exposure data for the media, identification(s) of media to which the audience is exposed are correlated with people data (e.g., presence information) collected by the metering system 102. The metering system 102 of the illustrated example collects inputs (e.g., audience identification data) representative of the identities of the audience member(s) (e.g., the panelists 106, 107 and 108). In some examples, the metering system 102 collects audience identification data by periodically or aperiodically prompting audience members in the monitored media presentation environment 104 to identify themselves as present in the audience. In some examples, the metering system 102 responds to predetermined events (e.g., when the media device 110 is turned on, a channel is changed, an infrared control signal is detected, etc.) by prompting the audience member(s) to self-identify. The audience identification data and the exposure data can then be complied with the demographic data collected from audience members such as, for example, the panelists 106, 107 and 108 during registration to develop metrics reflecting, for example, the demographic composition of the audience. The demographic data includes, for example, age, gender, income level, educational level, marital status, geographic location, race, etc., of the panelist.

The example metering system 102 of FIG. 1 is a stationary device that may be disposed on or near the media device 110. FIG. 1 illustrates the metering system 102 positioned or spaced from the media device 110. For example, the metering system 102 of the illustrated example of FIG. 1 is placed and/or coupled to (e.g., directly attached to) a stand 134 (e.g., a mantel of a fireplace or a stand) positioned near (e.g., below) the media device 110. However, in some examples, the metering system 102 can be positioned on an edge (e.g., an upper edge 136) of the media device 110. In some instances when the metering system 102 is attached to the media device 110, speakers inside the media device 110 cause vibrations that can otherwise be imparted to the meter 102 of the metering system 102.

Figure 2A:
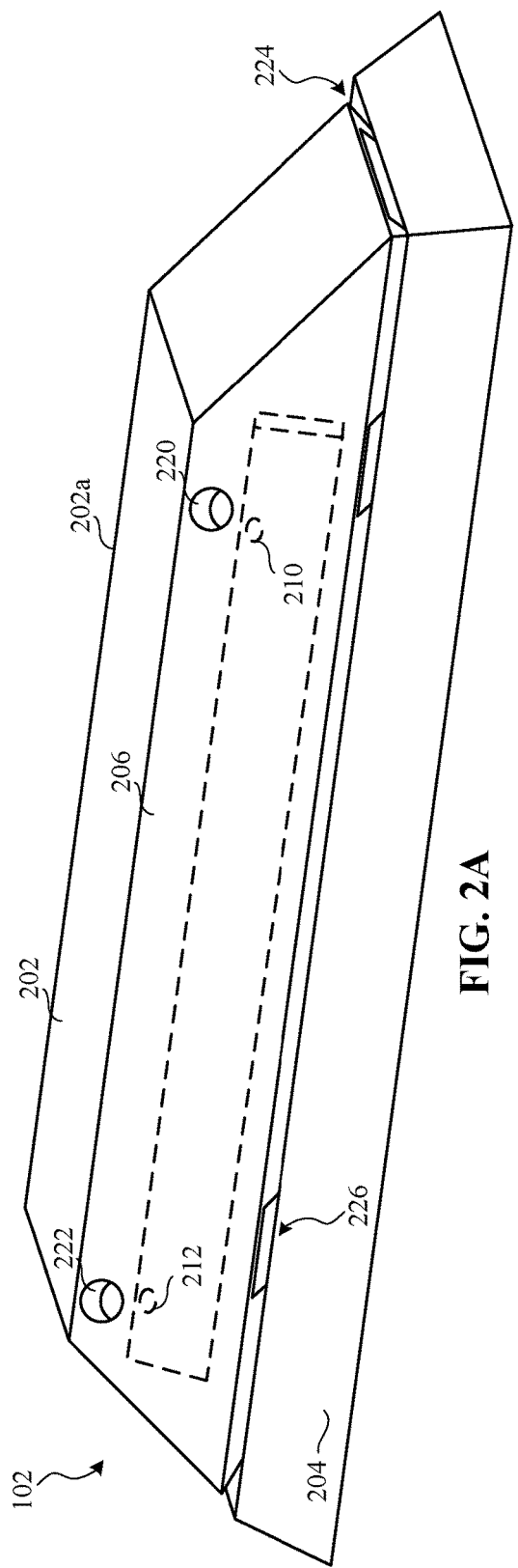
FIG. 2A is a perspective, front view of the example metering system of FIG. 1.
Figure 2B:
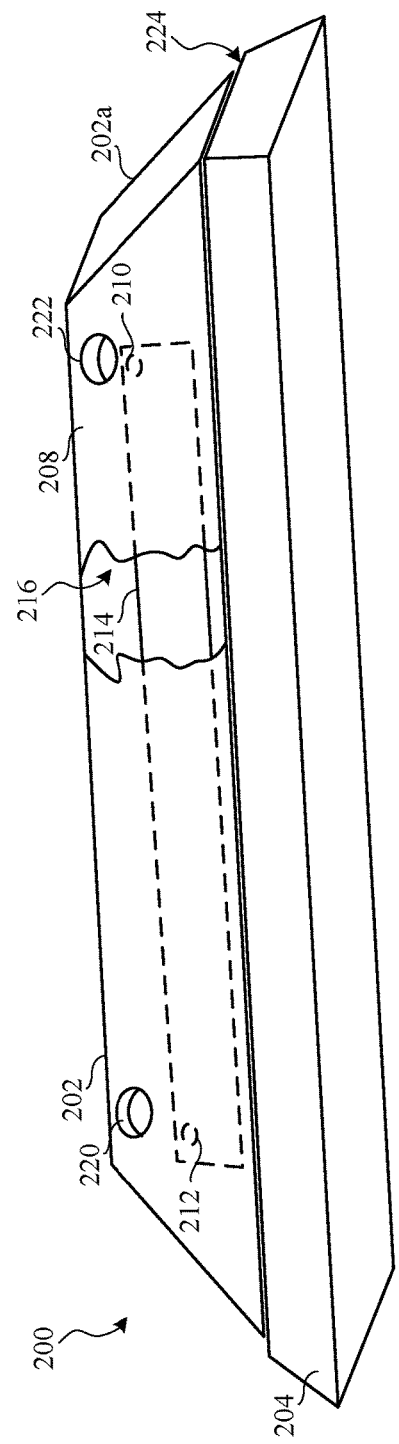
FIG. 2B is a perspective rear, partial cutaway view of the example metering system of FIG. 1.

FIG. 2A is a perspective, front view of the example metering system 102 of FIG. 1 (e.g., a meter assembly). FIG. 2B is a perspective rear, partial cutaway view of the example metering system 102 of FIG. 1. Referring to FIGS. 2A and 2B, the metering system 102 includes a meter 202 and a base 204. The meter 202 includes a processor, memory and/or software to perform audience measurement and/or people monitoring functions. A front surface 206 of the housing presents the display 132 of FIG. 1 that presents (e.g., illuminates) indicia representative of panelists 106, 107, 108 registered with the meter 202. To provide power to the metering system 102, the meter 202 of the illustrated example includes a battery (e.g., a rechargeable battery) located within a housing 202a of the meter 202 that can be charged via inductive charging (e.g., wireless or cordless charging). For example, the meter 202 can be removed from the base 204 and positioned on an induction pad to charge the battery. In some examples, the battery of the meter 202 can charge while positioned adjacent (e.g., aligned with) the base 204. In some examples, a rear surface 208 of the meter 202 can include one or more connectors (e.g., a USB connector, an Ethernet connector, RJ45 jack, Cat5e connector, a microUSB connector, coaxial cable connector, and/or any other type of connector(s)) to enable communication between the meter 202 and the media device 110. In some examples, the meter 202 communicatively couples to the media device 110 via Bluetooth communication, wireless communication, and/or any other communication.

The meter 202 of the illustrated example receives audio signals (e.g., that include audio signatures) to identify media content presented by the media device 110. To receive the audio signals, the meter 202 of the illustrated example includes one or more microphones 210 (e.g., other audio receiving or identification devices). Additionally, the meter 202 of the illustrated example includes speakers 212 to output audio. A main printed circuit board (PCB) 214 of the illustrated example supports the microphones 210 and the speakers 212. In other words, the microphones 210 and the speakers 212 are coupled to the PCB 214. To receive the PCB 214, the housing 202a of the meter 202 of the illustrated example has a cavity 216. In the illustrated example, the housing 202a includes openings 220 to receive audio (e.g., via the respective microphones 210) and/or openings 222 for audio output (e.g., via the respective speakers 212). The openings 220 are in communication with (e.g., aligned) respective ones of the microphones 210 and the openings 222 are in communication with (e.g., aligned) with respective ones of the speakers 212. The openings 220, 222 are positioned on the front surface 206 and the rear surface 208 of the meter 202. Thus, the speakers 212 of the illustrated example provide audio output towards the front surface 206 of the meter 202 and the rear surface 208 of the meter 202. Similarly, the microphones 210 of the illustrated example receive audio from the front surface 206 of the meter 202 and the rear surface 208 of the meter 202. However, in some examples, the meter 202 can include only one opening (e.g., one of the openings 222) and one speaker (e.g., one of the speakers 212) and/or one opening (e.g., one of the openings 220) and one microphone (e.g., one of the microphones 210).

To prevent degradation of the audio signal from the media device 110 due to noise or vibrations, the microphones 210 of the illustrated example are physically decoupled or isolated from the base 204, the media device 110, and/or the stand 134. To isolate the microphones 210, the meter 202 of the illustrated example includes a gap 224 (e.g., an air gap) between the base 204 and the meter 202 (e.g., the housing 202a). Specifically, the gap 224 between the base 204 and the meter 202 provides an insulator that insulates the meter 202 from vibrations or other noise imparted to the base 204.

To provide the gap 224 between the meter 202 and the base 204, the metering system 102 of the illustrated example employs a magnetic levitating system 226. The magnetic levitating system 226 of the illustrated example levitates the meter 202 relative to the base 204. As used herein, "magnetically levitates" means that the meter 202 (e.g., the housing 202a) in its entirety is elevated or spaced from the base 204 by a distance defined by the gap 224. In other words, all surfaces of the meter 202 (e.g., the housing 202a) are decoupled or detached from the base 204 (e.g., by a distance defined by the gap 224). To this end, the meter 202 levitates or hovers relative to the base 204 such that the housing 202 does not physically contact the base 204. In other words, the meter 202 of the illustrated example is completely detached from the base 204 and/or the meter 202 is (e.g., the microphones 210 are) not affected by vibrations imparted to the base 204 by audio of the media device 110. The gap 224 formed between the meter 202 and the base 204 via the magnetic levitating system 226 dampens noise or vibrations and/or prevents noise or vibrations imparted to the base from traveling to the meter 202 and/or being received by the microphones 210 of the meter 202. The magnetic levitation system 226 of the illustrated example isolates the meter 202 from the base 204 and, thus, the microphones 210 from noise that can otherwise be picked up by microphones 210 of the meter 202 caused by vibrations induced to the base 204 and/or the stand 134 by the audio of the media device 110 when the base 204 is in contact with the stand 134. In this manner, the meter 202 is decoupled or detached from the base 204 and the gap 224 dampens and/or insulates the meter 202 from vibrations. As a result, vibrations caused by the audio source of the media device 110 do not degrade detection of the audio signal output by the media device 110. Magnetically levitating the housing 202a of the meter 202 (e.g., entirely relative to the base 204) improves audio quality and/or audio detection accuracy and significantly reduces costs compared to alternative metering devices that isolate individual microphones.

As used herein "magnetically levitates" means that a significant portion of the meter 202 is (e.g., entirely) decoupled relative to the base 204. As used herein, "a significant portion" means approximately between 75% to 100% of a surface area of the meter 202 that is oriented toward one or more surfaces of the base and/or a surface area of the meter 202 that would otherwise engage or contact the base 204 is detached or decoupled from the base 204 (e.g., a meter 700 of FIG. 7).

Figure 3:
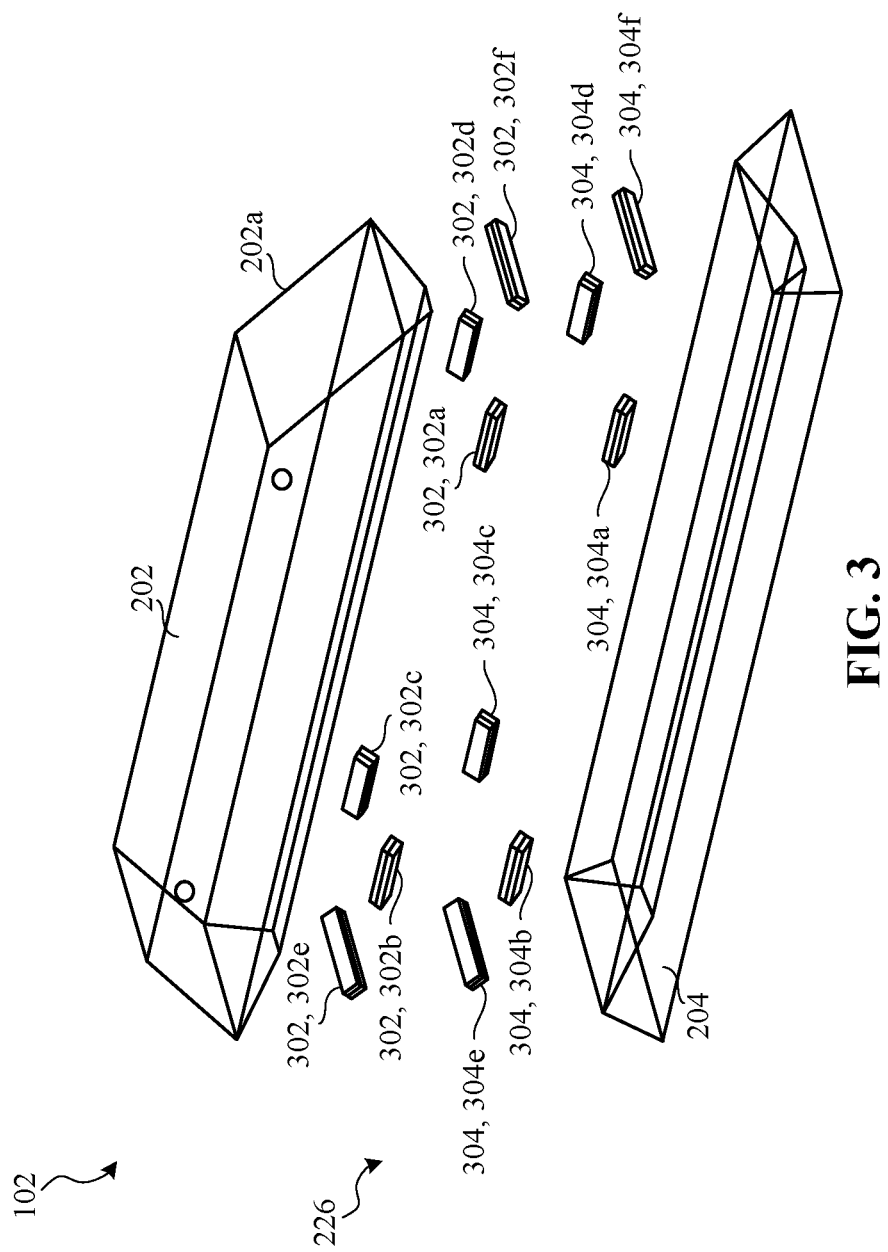
FIG. 3 is an exploded view of the example metering system of FIGS. 1, 2A and 2B.

FIG. 3 is an exploded view of the example metering system 102 of FIGS. 1, 2A and 2B. The metering system 102 of the illustrated example includes the meter 202, the base 204 and the magnetic levitating system 226. The magnetic levitating system 226 of the illustrated example includes a plurality of housing magnets 302 (e.g., a first set of magnets) and a plurality of base magnets 304 (e.g., a second set of magnets). The meter 202 supports or includes the housing magnets 302 and the base includes or supports the base magnets 304. When coupled to the meter 202, respective ones of the housing magnets 302 align or correspond with respective ones of the base magnets 304. Specifically, a polarity of the housing magnets 302 is positioned to repel a polarity of the base magnets 304 to cause the meter 202 to levitate relative to the base 204. In other words, the same polarities of the housing magnets 302 and the base magnets are oriented toward each other to cause the housing magnets 302 to repeal the base magnets 304. In the illustrated example, the housing magnets include a first housing magnet 302a, a second housing magnet 302b, a third housing magnet 302c, a fourth housing magnet 302d, a fifth housing magnet 302e, and a sixth housing magnet 302f. Similarly, the base magnets include a first base magnet 304a, a second base magnet 304b, a third base magnet 304c, a fourth base magnet 304d, a fifth base magnet 304e, and a sixth base magnet 304f. Thus, the meter 202 of the illustrated example includes six housing magnets 302 and the base 204 includes six base magnets 304. In some examples, the metering system 102 (e.g., the meter 202 and the base 204) can include any number of magnets less than six (e.g., 2, 4, etc.) or greater than six (e.g., 8, 10, etc.).

The housing magnets 302a-f and the base magnets 304a-f have the same dimensional profiles (e.g., (e.g., width, length, thickness). In the illustrated example, each of the housing magnets 302 and each of the base magnets 304 have a rectangular shape. However, in some examples, the housing magnets 302 and/or the base magnets 304 can have a round shape, a triangular shape, a square shape, and/or any other shape. In some examples, each of the housing magnets 302a-f and each of the base magnets 304a-f can have different dimensions. Additionally, the housing magnets 302a-d and the base magnets 304a-d have the same magnetic intensity. In some examples, the housing magnets 302a-d and the base magnets 304a-d have different magnetic intensity.

Figure 4A:
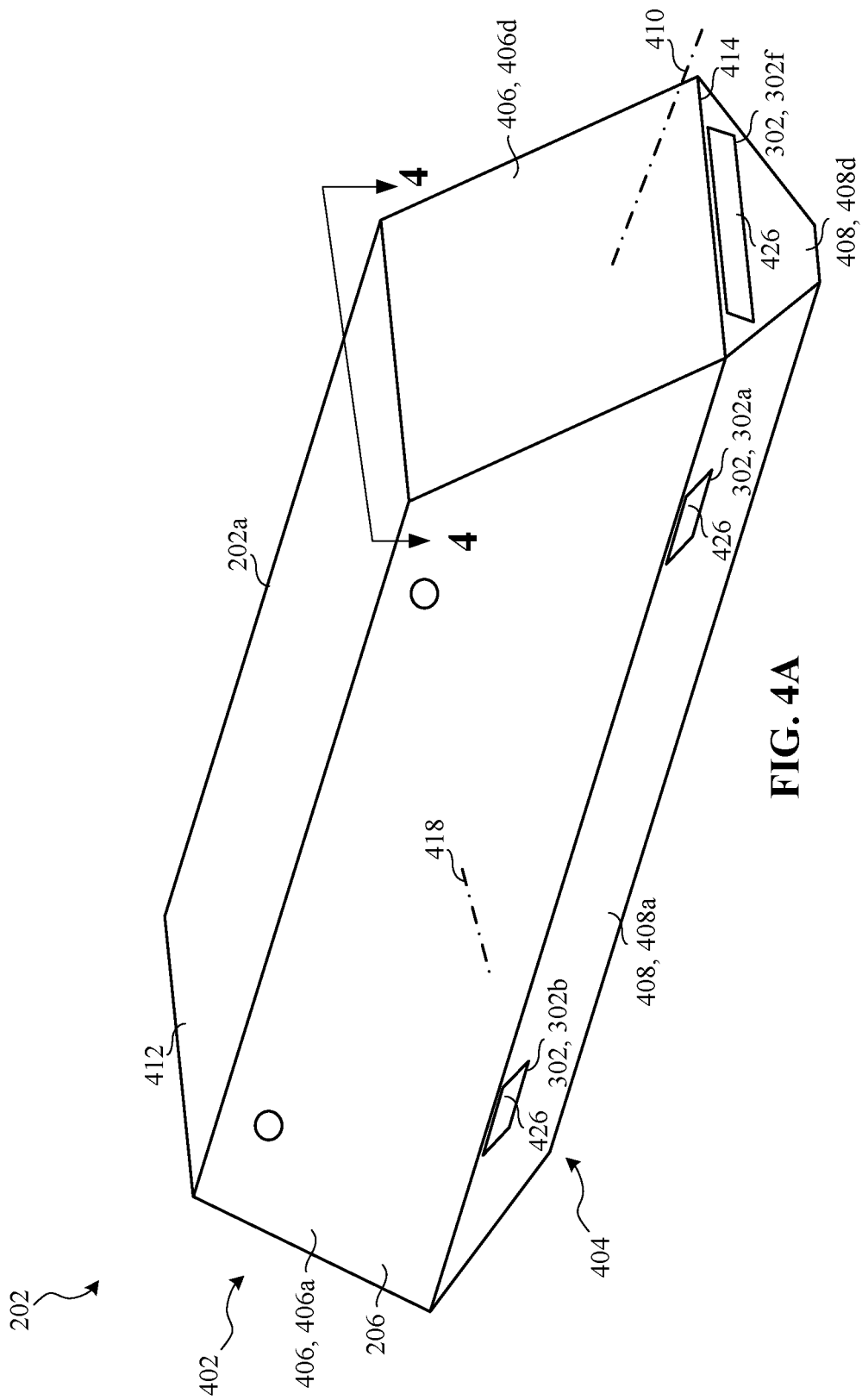
FIG. 4A is a perspective view of an example meter of the example metering system of FIGS. 1, 2A, 2B, and 3.
Figure 4E:
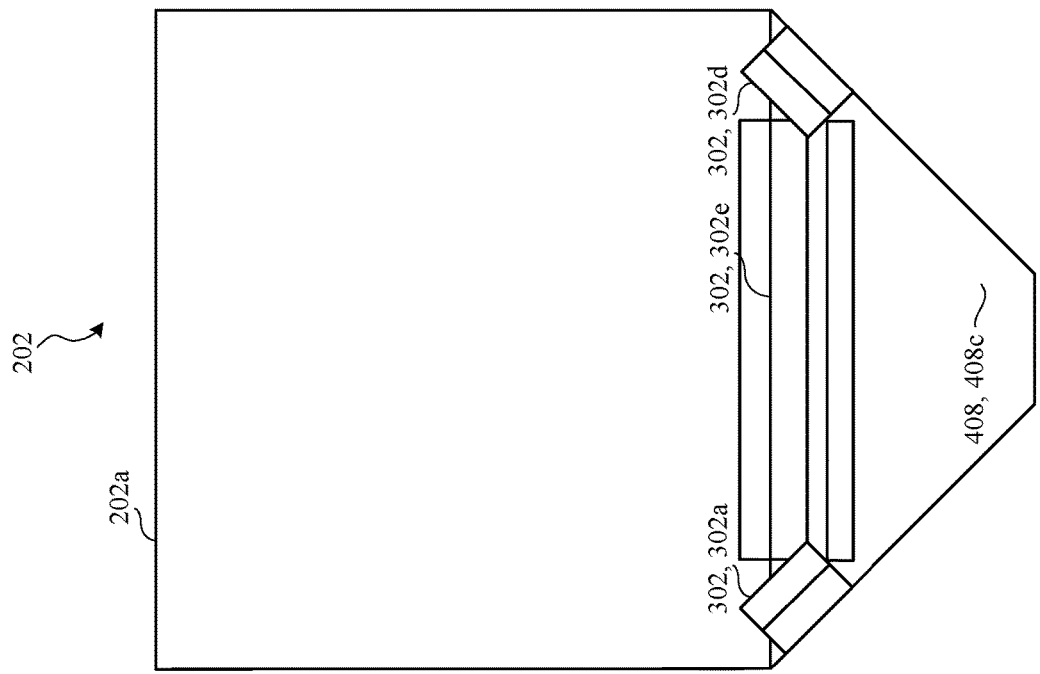
FIG. 4E is a cross-sectional, side view of the meter taken along line 4-4 of FIG. 4A.
Figure 4D:
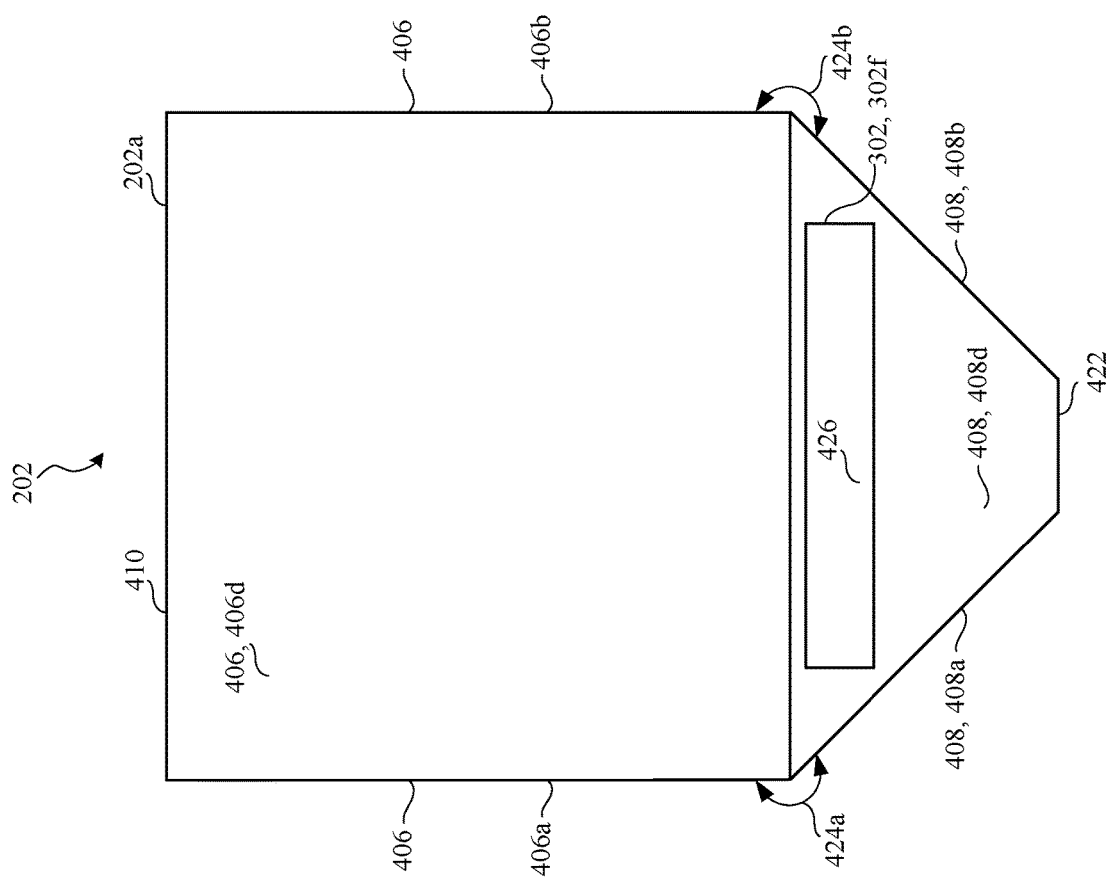
FIG. 4D is a side view of the example meter of FIGS. 4A-4C.
Figure 4F:
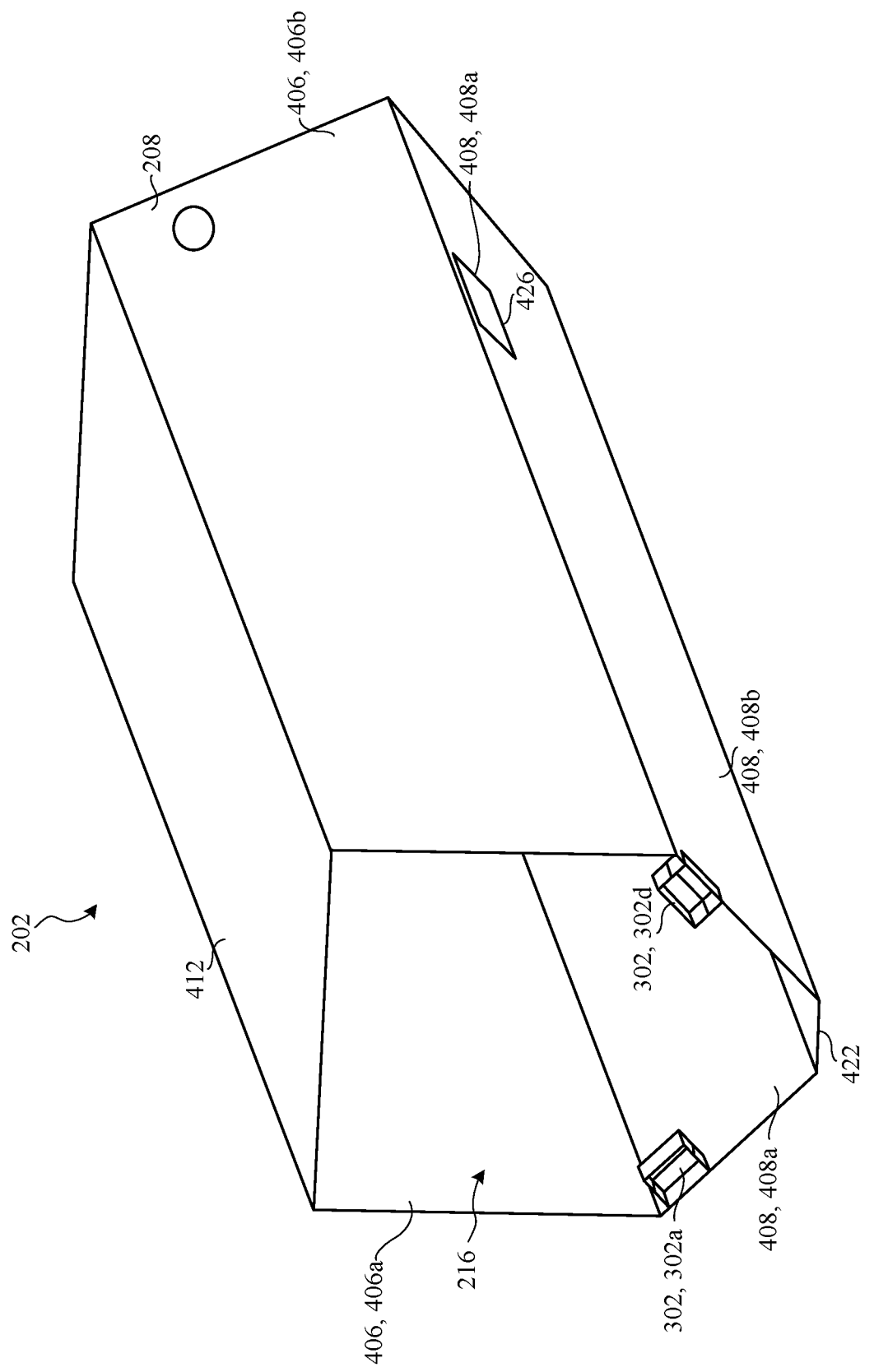
FIG. 4F is a cross-sectional, perspective view of the meter taken along line 4-4 of FIG. 4A.

FIG. 4A is a perspective view of the meter 202 of the example metering system 102 of FIGS. 1, 2A, 2B, and 3. FIG. 4B is a front view of the example meter 202 of FIG. 4A. FIG. 4C is a bottom view of the example meter 202 of FIG. 4A. FIG. 4D is a side view of the example meter 202 of FIG. 4A. FIG. 4E is a cross-sectional, side view of the meter 202 taken along line 4-4 of FIG. 4A. FIG. 4F is a cross-sectional, perspective view of the meter 202 taken along line 4-4 of FIG. 4A.

Referring to FIGS. 4A-4F, the meter 202 of the illustrated example includes an upper portion 402 (e.g., an upper body) and a lower housing portion 404 (e.g., a lower body) that define the cavity 216. The upper portion 402 includes upper side walls 406 and the lower housing portion 404 include lower housing side walls 408.

For example, the upper portion 402 of the illustrated example includes a first upper housing side wall 406a (e.g., a front-side upper housing wall), a second upper housing side wall 406b (e.g., a rear-side upper housing wall), a third upper housing side wall 406c (e.g., a left-side upper housing wall), and a fourth upper housing side wall 406d (e.g., a right-side upper housing wall). The first upper housing side wall 406a defines the front surface 206 of the meter 202 and the second upper housing side wall 406b defines the rear surface 208 of the meter 202. The third upper housing side wall 406c and the fourth upper housing side wall 406d are end walls. The first upper housing side wall 406a and the second upper housing side wall 406b are substantially parallel relative to a plane taken along a first axis 410 (e.g., a longitudinal axis) of the meter 202. As used herein, "substantially parallel" means perfectly parallel or almost parallel (e.g., within 10 degrees of perfectly parallel). The first upper housing side wall 406a and/or the second upper housing side wall 406b are substantially perpendicular relative to an upper housing wall 412 (e.g., a top wall or surface). As used herein, substantially perpendicular means perfectly perpendicular (e.g., exactly a 90 degree angle) or almost perpendicular (e.g., within 10 degrees of perfectly perpendicular). In other words, the first upper housing side wall 406a and the second upper housing side wall 406b are vertical walls and the upper housing wall 412 is a horizontal wall in the orientation of FIGS. 4A-4F.

The first upper housing side wall 406a and the second upper housing side wall 406b have trapezoidal shapes. To this end, the third upper housing side wall 406c tapers outwardly from the upper housing wall 412 to an interface 414 formed between the upper portion 402 and the lower housing portion 404. Likewise, the fourth upper housing side wall 406d tapers outwardly from the upper housing wall 412 to the interface 414. The third upper housing side wall 406c and the upper housing wall 412 form a first upper housing angle 416a and the fourth upper housing side wall 406d and the upper housing wall 412 form a second upper housing angle 416b. In the illustrated example, the fourth upper housing side wall 406d is symmetrical (e.g., identical) to the third upper housing side wall 406c. In other words, the third upper housing side wall 406c is a mirror of the fourth upper housing side wall 406d relative to a second axis 418 (e.g., an axis substantially perpendicular to the first axis 410) of the meter 202. The second axis 418 is substantially perpendicular to the first axis 410. Thus, the first upper housing angle 416a and the second upper housing angle 416b of the illustrated example are symmetrical (e.g., identical). In the illustrated example, the first upper housing angle 416a and the second upper housing angle 416b are between 10 degrees and 80 degrees. For example, the first upper housing angle 416a and the second upper housing angle 416b can be 45 degrees. In some examples, the first upper housing angle 416a is different (e.g., greater or less) than the second upper housing angle 416b. In some examples, the first upper housing side wall 406a and/or the second upper housing side wall 406b can be tapered relative to (e.g., toward) the upper housing wall 412. In some examples, the third upper housing side wall 406c is not tapered (e.g., substantially parallel) relative to the fourth upper housing side wall 406d. In some examples, the third upper housing side wall 406c and/or the fourth upper housing side wall 406d is substantially perpendicular relative to the upper housing wall 412. In some examples, the upper portion 402 has a rectangular shape. In some examples, the upper portion 402 defines a spherical shape, a square shape and/or any other shape.

The lower housing portion 404 of the illustrated example includes a first lower housing side wall 408a (e.g., a front lower housing wall), a second lower housing side wall 408b (e.g., a rear lower housing wall), a third lower housing side wall 408c (e.g., a left lower housing wall), and a fourth lower housing side wall 408d (e.g., a right lower housing wall). The third lower housing side wall 408c and the fourth lower housing side wall 408d are end walls. The lower housing side walls 408a-d taper inwardly from the interface 414 to a lower housing wall 422 (e.g., a bottom lower housing wall). The lower housing side walls 408a-d and the lower housing wall 422 define a trapezoidal shape. For example, the first lower housing side wall 408a and the lower housing wall 422 form a first lower housing angle 424a, the second lower housing side wall 408b and the lower housing wall 422 form a second lower housing angle 424b, the third lower housing side wall 408c and the lower housing wall 422 form a third lower housing angle 424c and the fourth upper housing side wall and the lower housing wall 422 form a fourth lower housing angle 424d. The first, second, third and fourth lower housing angles 424a-d of the illustrated example are equal. Each of the lower housing angles 424a-d can be between approximately 10 degrees and 90 degrees. In some examples, one the lower housing angles 424a-d can be different than another one of the other lower housing angles 424a-d. In some examples, the lower housing portion 404 has a rectangular shape, a square shape, a spherical shape, and/or any other shape.

The lower housing portion 404 supports the plurality of housing magnets 302. In particular, the housing magnets 302 are located adjacent (e.g. about) a perimeter of the lower housing portion 404. Specifically, the lower housing side walls 408a-d support the housing magnets 302. For example, the first lower housing side wall 420a supports the first housing magnet 302a and the second housing magnet 302b. The second lower housing side wall 420b supports the third housing magnet 302c and the fourth housing magnet 302d. The third lower housing side wall 408c supports the fifth housing magnet 302e, and the fourth lower housing side wall 420d supports the sixth housing magnet 302f.

The housing magnets 302 are positioned within respective apertures formed in the lower housing side walls 408a-d. Additionally, outer surfaces 426 of the housing magnets 302 are positioned at angles that are complementary to the angles of the corresponding lower housing side walls 408a-d to which the housing magnets 302a-f are attached. For example, the outer surfaces 426 of the housing magnets 302 are positioned at angles corresponding to angles of the lower housing side walls 408a-d. In the illustrated example, the outer surfaces 426 of the housing magnets 302 are substantially flush (e.g., flush mounted) relative to (e.g., outer surfaces of) the lower housing side walls 408a-d. As used herein, "substantially flush" means that the outer surfaces 426 of the housing magnets 302 form a continuous or smooth transition with corresponding ones of the lower housing side walls 408a-d when the housing magnets 302a-f are coupled to the corresponding lower housing side walls 408a-d. For example, the outer surfaces 426 of the first and second housing magnets 302a-b are substantially flush with the first lower housing side wall 408a, the outer surfaces 426 of the third and fourth housing magnets 302c-d are substantially flush with the second lower housing side wall 408b, the outer surface 426 of the fifth housing magnet 302e is substantially flush with the third lower housing side wall 408c, and the outer surface 426 of the sixth housing magnet 302f is substantially flush with the fourth lower housing side wall 408d. In some examples, the outer surfaces 426 of the housing magnets 302 may be offset (e.g., recessed or protruding from outer surfaces of) the corresponding ones of the lower housing side walls 408a-d. In some examples, however, the housing magnets 302 are located within the respective housing lower side walls and/or the housing lower wall 422. In some such examples, the housing magnets 302 are not visible from an exterior (e.g., an exterior of the housing lower side walls 408) of the housing 302. In some examples, the housing lower side walls 408 and/or the housing lower wall 422 can be composed of a magnetic material.

The first and second housing magnets 302a-b and the third and fourth housing magnets 302c-d are positioned symmetrically relative to the first axis 410 and the second axis 418. Additionally, the fifth housing magnet 302e and the sixth housing magnet 302f are symmetrically located relative to the first axis 410 and the second axis 418. A length 428 of the meter 202 is significantly greater than a width 430 of the meter 202. For example, the length 428 can be between approximately 8 to 10 times the size of the width 430. In the illustrated example, the length 428 is approximately 10.8 inches and the width 430 is approximately 1.2 inches. The lower housing portion 404 protrudes from the interface 414 a height 432 (e.g., a vertical distance in the orientation of FIGS. 4A-4F) of approximately between 0.47 inches and 0.6 inches.

The housing magnets 302 can be formed with the meter 202 via insert molding, over molding, additive manufacturing, can be coupled to the body via fasteners (e.g., chemical fasteners such as adhesive, etc.) and/or may be coupled to the meter 202 via any other suitable manufacturing and/or fastening technique(s).

Figure 5A:
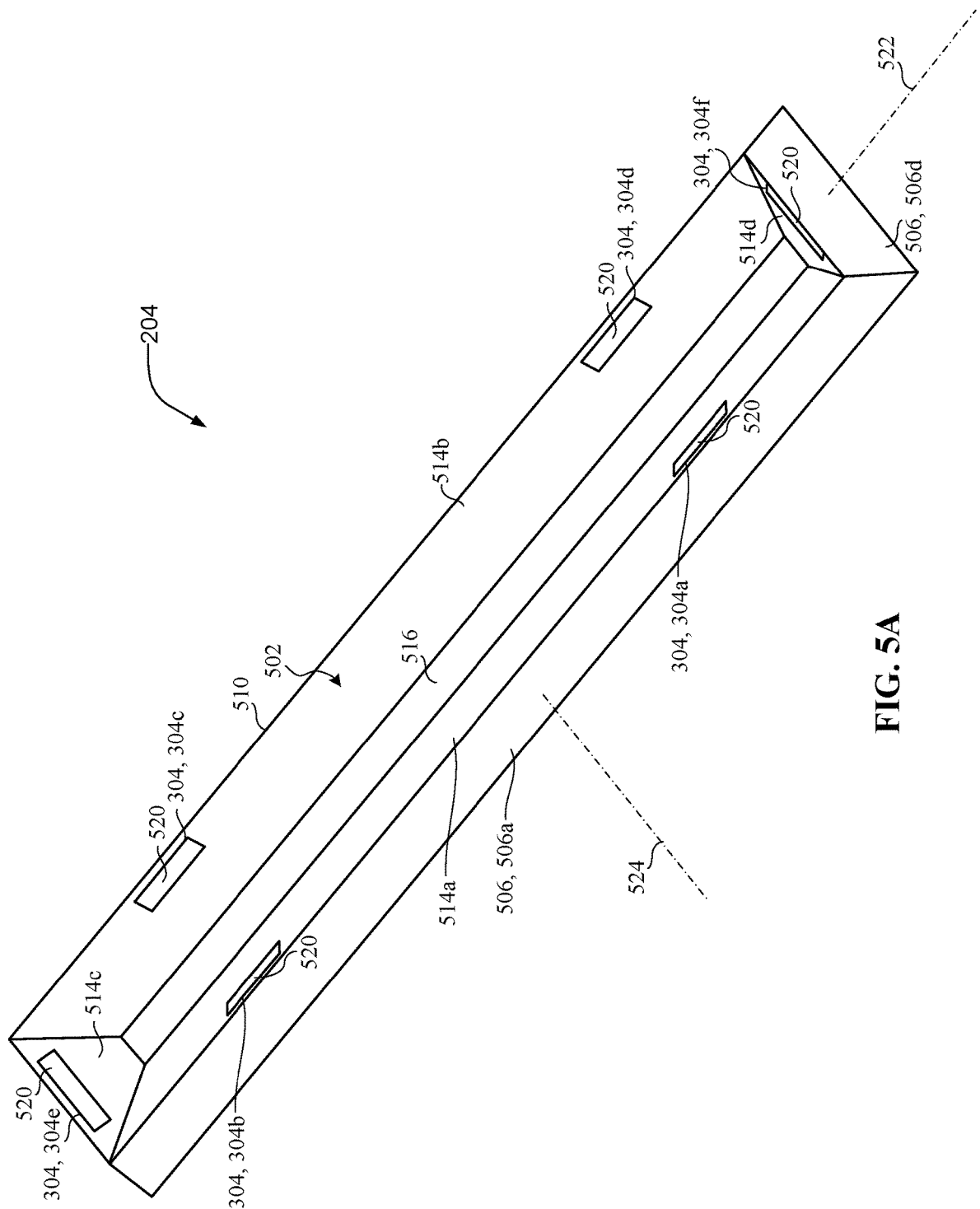
FIG. 5A is a perspective, top view of an example base 204 of the example metering system of FIGS. 1, 2A, 2B and 3.
Figure 5D:
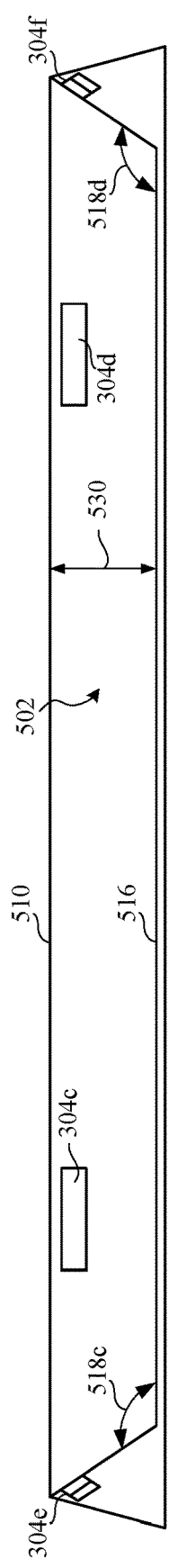
FIG. 5D is a cross-sectional front view of the example base of FIGS. 5A-5C.
Figure 5E:
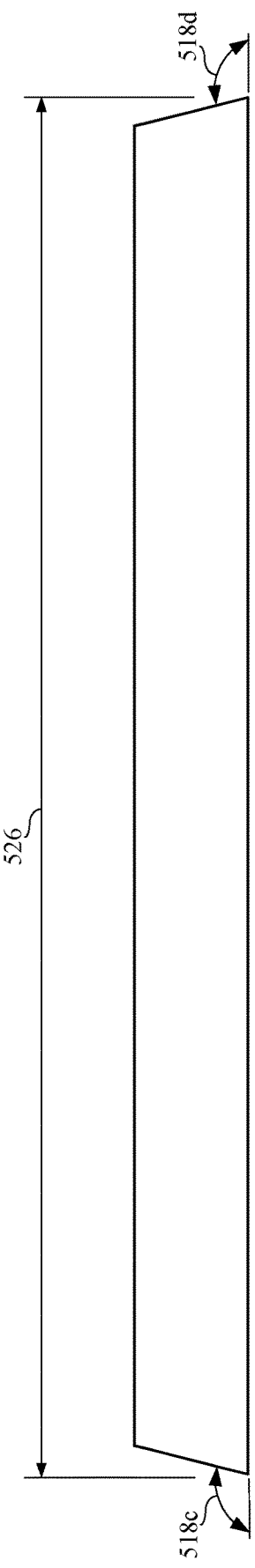
FIG. 5E is a front view of the example base of FIGS. 5A-5D.
Figure 5F:
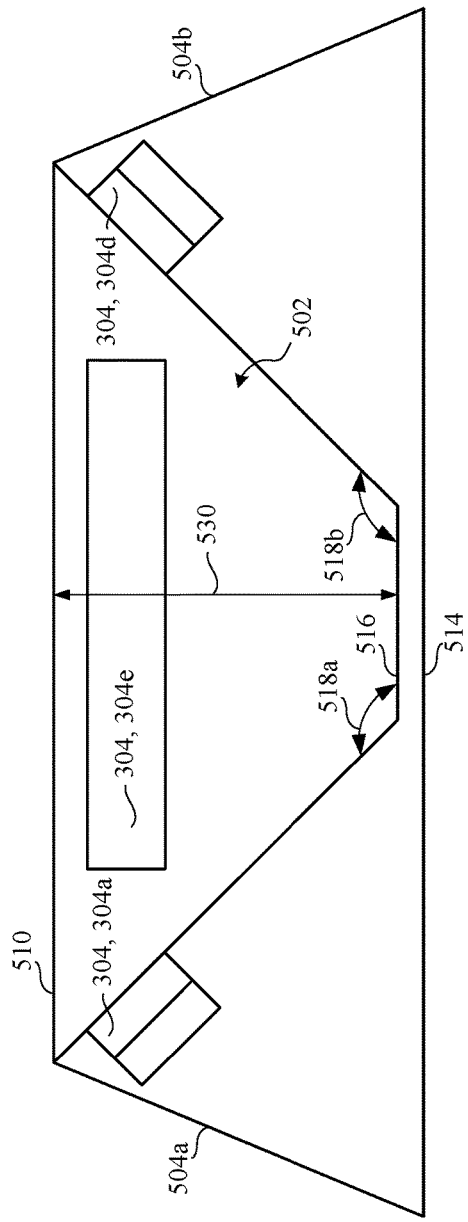
FIG. 5F is a cross-sectional side view of the example base of FIGS. 5A-5E.
Figure 5G:
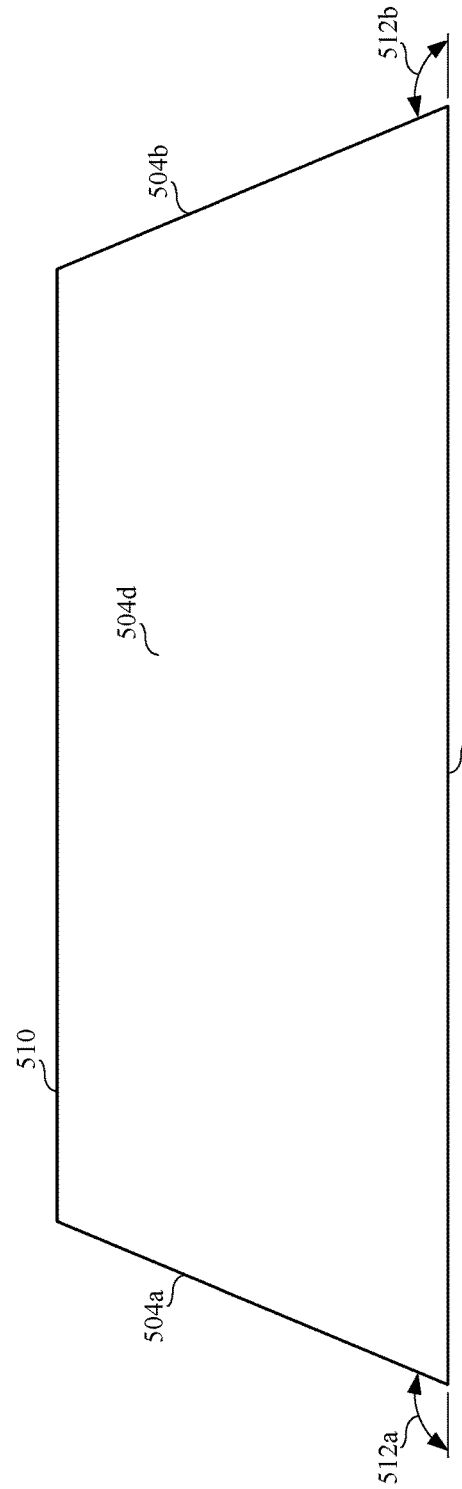
FIG. 5G is a side view of the example base of FIGS. 5A-5F.

FIG. 5A is a perspective, top view of the example base 204 of FIGS. 1, 2A, 2B, and 3. FIG. 5B is a top view of the example base 204 of FIG. 5A. FIG. 5C is a perspective, bottom view of the example base 204 of FIGS. 5A and 5B. FIG. 5D is a cross-sectional front view of the example base 204 of FIGS. 5A-5C. FIG. 5E is a front view of the example base 204 of FIGS. 5A-5D. FIG. 5F is a cross-sectional side view of the example base 204 of FIGS. 5A-5E. FIG. 5G is a side view of the example base 204 of FIGS. 5A-5F.

Referring to FIGS. 5A-5G, the base 204 of the illustrated example defines a cavity 502 (e.g., a well, a recess, etc.) and a mounting surface 504. The mounting surface 504 is substantially planar and is positionable on the stand 134. The base 204 includes base outer side walls 506 and a lower outer wall 508. The lower outer wall 508 defines the mounting surface 504. The base outer side walls 506 include a first base outer side wall 506a (e.g., a front outer side wall), a second base outer side wall 504b (e.g., a rear outer side wall), a third base outer side wall 506c (e.g., a left-side outer wall), and a fourth base outer side wall 506d (e.g., a right-side outer wall). The first base outer side wall 506a is opposite the second base outer side wall 506b and the third base outer side wall 506c is opposite the fourth base outer side wall 506d. Each of the base outer side walls 506 has a trapezoidal shape or profile. The base outer side walls 506 taper inwardly from the lower outer wall 508 towards an upper edge 510 (e.g., an upper surface) of the base 204. For example, the first base outer side wall 506a and the lower outer wall 508 form a first outer base angle 512a, the second base outer side wall 506b and the lower outer wall 508 form a second outer base angle 512b, the third base outer side wall 506c and the lower outer wall 508 form a third outer base angle 512c, and the fourth base outer side wall 506d and the lower outer wall 508 form a fourth outer base bae angle 512d. The outer base angles 512a-d of the illustrated example are equal. For example, the outer base angles 512a-d can be approximately between 10 degrees and 80 degrees.

The base 204 includes base inner side walls 514 and a lower inner wall 516 that define the cavity 502. For example, the base 204 includes a first base inner side wall 514a, a second base inner side wall 514b, a third base inner side wall 514c, and a fourth base inner side wall 514d. The base inner side walls 514 taper inwardly from the upper edge 510 of the base 204 to the lower inner wall 516. For example, the first base inner side wall 514a and the lower inner wall 516 form a first base inner angle 518a, the second base inner side wall 514b and the lower inner wall 516 form a second base inner angle 518b, the third base inner side wall 514c and the lower inner wall 516 form a third base inner angle 518c, and the fourth base inner side wall 514d and the lower inner wall 516 form a fourth base inner angle 518d. For example, the base inner angles 518a-d can be approximately between 100 degrees and 165 degrees. In the illustrated example, the base inner angles 518a-d are equal. However, in some examples, one or more of the base inner angles 518a-d can be different than one or more of other ones of the base inner angles 518a-d.

The base 204 supports the plurality of base magnets 304. Specifically, the base inner side walls 514 support the base magnets 304. For example, the first base inner side wall 514a supports a first base magnet 304a and a second base magnet 304b. The second base inner side wall 514b supports a third base magnet 304c and a fourth base magnet 304d. The third base inner side wall 514c supports a fifth base magnet 304e, and the fourth base inner side wall 514d supports a sixth base magnet 304f. The base magnets 304 are located adjacent (e.g. about) a perimeter of the base 204.

The base magnets 304 are positioned within respective apertures formed in the base inner side walls 514. Additionally, outer surfaces 520 of the base magnets 304 are positioned at angles that are complementary to the angles of the corresponding base inner side walls 514a-d to which the base magnets 304a-f are attached. In the illustrated example, the outer surfaces 520 of the base magnets 304 are substantially flush (e.g., flush mounted) relative to (e.g., outer surfaces of) the base inner side walls 514a-d. As used herein, "substantially flush" means that the outer surfaces 520 of the base magnets 304 form a continuous or smooth surface or transition with corresponding ones of the base inner side walls 514a-d when the base magnets 304a-f are coupled to the base inner side walls 514a-d. For example, the outer surfaces 520 of the first and second base magnets 304a-b are substantially flush with the first base inner side wall 514a, the outer surfaces 520 of the third and fourth base magnets 304c-d are substantially flush with the second base inner side wall 514b, the outer surface 520 of the fifth base magnet 304e is substantially flush with the third base inner side wall 514c, and the outer surface 520 of the sixth base magnet 30rf is substantially flush with the fourth base inner side wall 514d. In some examples, the outer surfaces 520 of the base magnets 304 may be offset (e.g., recessed or protruding from outer surfaces of) the corresponding ones of the base inner side walls 514a-d. In some examples, however, the base magnets 304 are located within the respective base inner side walls 514 and/or the base lower inner wall 516. In some such examples, the base magnets 304 are not visible from an exterior (e.g., an exterior of the base inner side walls 514 and/or the lower inner wall 516 of the base 204). In some examples, the base inner side walls 514 and/or the base inner wall 516 can be composed of a magnetic material.

The first and second base magnets 304a-b and the third and fourth base magnets 304c-d are positioned symmetrically relative to a first or longitudinal axis 522 and a second or latitudinal axis 524 of the base 204. Additionally, the fifth base magnet 304e and the sixth base magnet 304f are symmetrically located relative to the longitudinal axis 522 and the latitudinal axis 524. A length 526 of the base 204 is significantly greater than a width 528 of the base 204. For example, the length 526 can be between approximately 8 to 10 times the size of the width 528. In the illustrated example, the length 526 is approximately 11.47 inches and the width 528 is approximately 1.87 inches. The cavity 502 has a height 530 (e.g., a vertical distance in the orientation of FIGS. 5A-5F) between the upper edge 510 and the lower inner wall 516 of approximately between 0.53 inches and 0.7 inches. Referring to FIG. 5D, the cavity 502 has an inverted trapezoidal cross-sectional shape.

The base magnets 304 can be formed with the base 204 via insert molding, over molding, additive manufacturing, can be coupled to the base 204 via fasteners (e.g., chemical fasteners such as adhesive, etc.) and/or may be coupled to the base 204 via any other suitable manufacturing and/or fastening technique(s). In some examples, different sized magnets can be used. For example, magnets having different forces and/or surface areas can be used to cause the meter 202 to levitate relative to the base 204. For example, a strength of a magnet force can be proportional to a mass of the meter 202 or a number of magnets needed to levitate the meter 202 relative to the base 204.

Figure 6A:
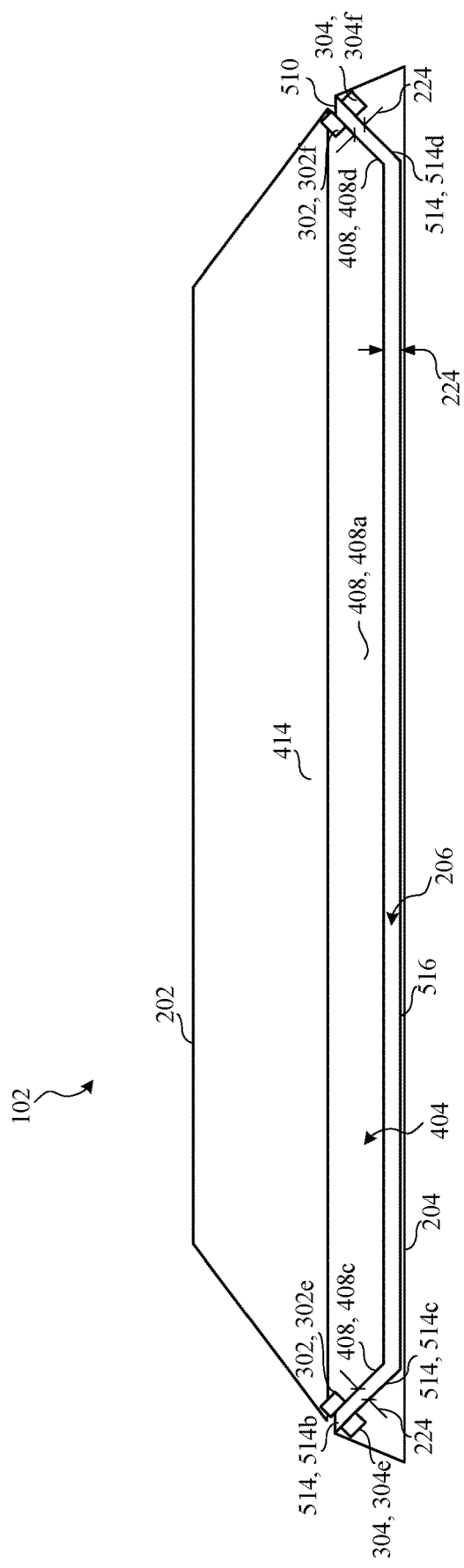
FIG. 6A is a cross-sectional front view of the example metering system of FIGS. 1, 2A, 2B and 3.
Figure 6B:
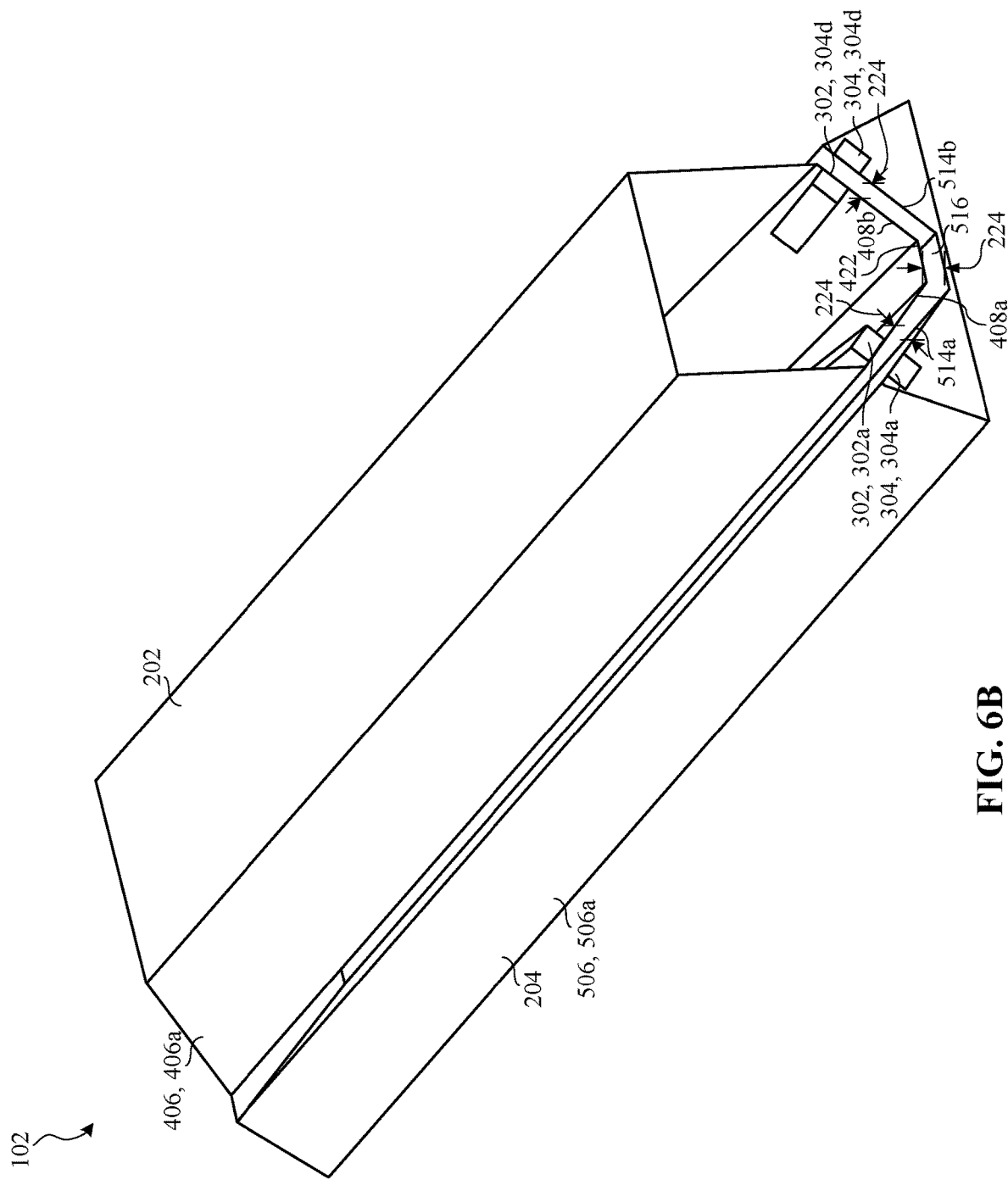
FIG. 6B is a perspective, cross-sectional side view of the example metering system of FIGS. 1, 2A, 2B, and 3.
Figure 6C:
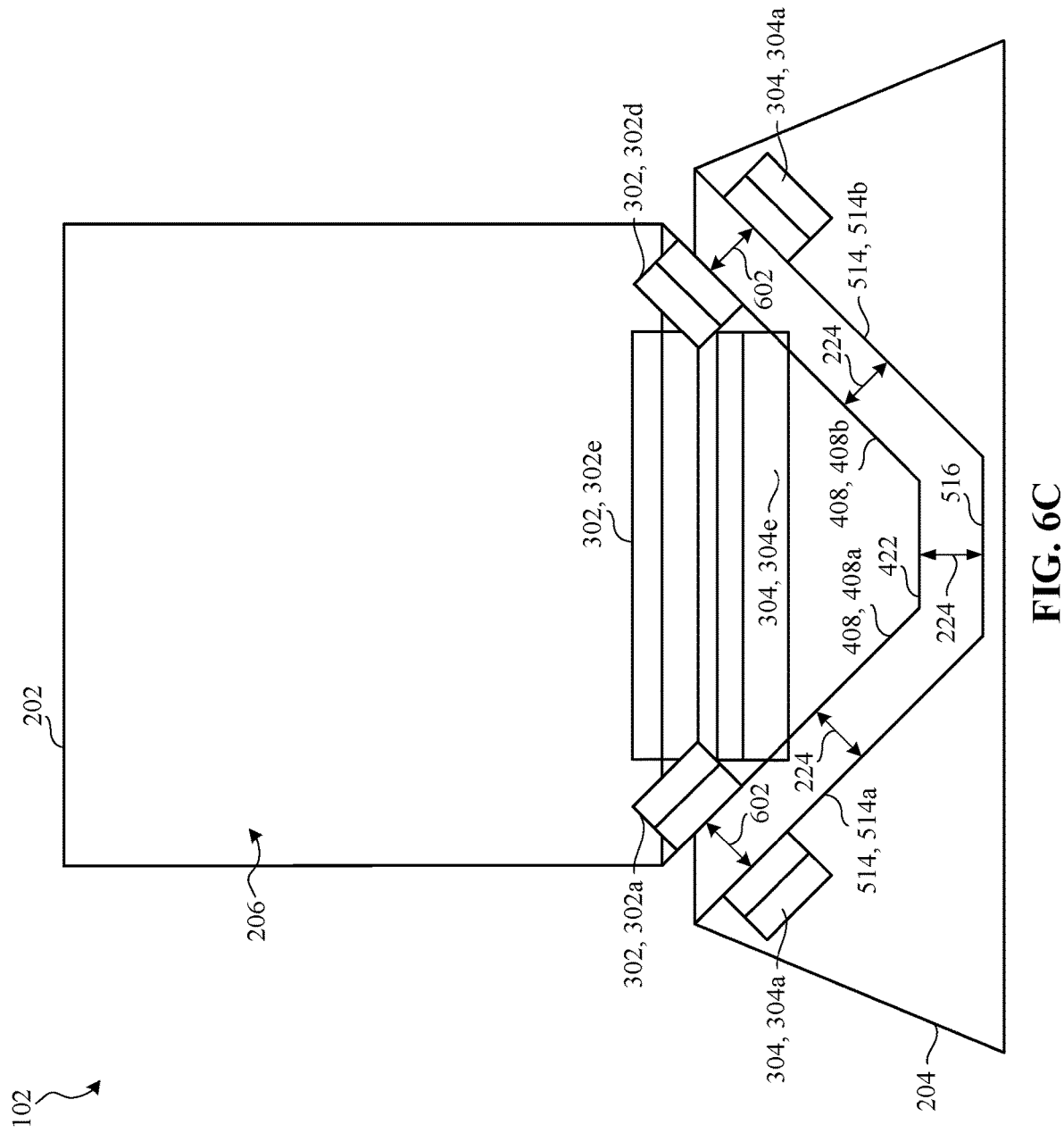
FIG. 6C is a cross-sectional side view of the example metering system of FIGS. 1, 2A, 2B, and 3.

FIG. 6A is a cross-sectional front view of the metering system 102 of FIGS. 1, 2A, 2B and 3. FIG. 6B is a perspective cross-sectional side view of the example metering system of FIGS. 1, 2A, 2B, and 3. FIG. 6C is a cross-sectional side view of the example metering system 102 of FIGS. 1, 2A, 2B, and 3.

Referring to FIGS. 6A-6C, the base 204 receives at least a portion of the meter 202. Specifically, the cavity 502 of the base 204 receives the lower housing portion 404 of the meter 202. In the illustrated example, the interface 414 of the meter 202 is located adjacent the upper edge 510 of the base 204 and the lower housing side walls 408 of the meter 202 extend or project in the cavity 502. Although the lower housing side walls 408 are positioned in the cavity 502, the meter 202 levitates relative to the base 204. Thus, the meter 202 is detached or decoupled (e.g., physically decoupled) from the base 204. In other words, the meter 202 nests (e.g., hovers) within the cavity 502 of the base 204. For instance, the meter 202 hovers relative to the base 204. For example, the lower housing side walls 408 are spaced from the base inner side walls 514 of the base 204 and the lower housing wall 422 is spaced from the lower inner wall 516. In particular, the lower housing side walls 408 are spaced from the base inner side walls 514 by a distance defined the gap 224. For example, the gap 224 can be between approximately 1/10 of an inch or 3/8 of an inch (e.g., 1/8$^{th}$ of an inch).

Additionally, the base inner side walls 514 of the base 204 maintain the meter 202 aligned (e.g., centered) relative to the base 204. In other words, the first axis 410 of the meter 202 is substantially aligned with the longitudinal axis 522 of the base 204 and the second axis 418 of the meter 202 is substantially aligned with the latitudinal axis 524 of the base 204. As used herein, "substantially aligned" means perfectly aligned (e.g. co-planar or parallel) or almost perfectly aligned (e.g., within 10 percent of perfectly aligned). When the meter 202 nests or hovers with the base 204, the lower housing side walls 408 of the meter 202 are complementary (e.g., substantially parallel) to the base inner side walls 514 of the base 204 and the lower housing wall 422 of the lower housing portion 404 of the meter 202 is complementary (e.g., substantially parallel) relative to the lower inner wall 516 of the base 204.

To enable the meter 202 to levitate relative to the base 204, respective ones of the housing magnets 302 align with respective ones of the base magnets 304. For example, the first housing magnet 302a directly aligns (e.g., opposes) with the first base magnet 304a, the second housing magnet 302b directly aligns (e.g., opposes) with second base magnet 304b, the third housing magnet 302c directly aligns (e.g., opposes) with third base magnet 304c, the fourth housing magnet 302d directly aligns (e.g., opposes) with fourth base magnet 304d, the fifth housing magnet 302e directly aligns (e.g., opposes) with fifth base magnet 304e, and the sixth housing magnet 302f directly aligns (e.g., opposes) with sixth base magnet 304f. The housing magnets 302 and the base magnets 304 have the same polarity oriented toward each other. As a result, the housing magnets 302 and the base magnets 304 repel or oppose each other to generate a force 602 that causes the meter 202 to levitate relative to (e.g., move away from) the base 204. In other words, the meter 202 is spaced from the base 204 by the gap 224. Specifically, the entirety of the meter 202 is spaced or offset from the base 204 by the gap 224.

In operation, the gap 224 (e.g., the insulator or air gap) prevents vibrations imparted to the base 204 from reaching the meter 202 and, thus, the microphones 210 of the meter 202. The magnetic levitation system 226 of the illustrated example isolates the meter 202 from the base 204 by causing the meter 202 to move away (e.g., lift away) from the base 204. By isolating or levitating the meter 202 relative to the base 204, the microphones 210 can be coupled to the printed circuit board. As a result, the metering system 102 of the illustrated example provides improved audio quality at reduced costs to alternatives that isolate individual microphones in a housing (e.g., the meter 202). In other words, magnetically levitating an entire housing reduces costs as compared with approaches where each microphone is isolated.

Additionally, to help maintain levitation and/or alignment of the meter 202 relative to the base 204, the lower housing side walls 408 are complementary (e.g., substantially parallel) relative to the base inner side walls 514 of the base 204. For example, the first base inner wall 514a is oriented toward the first housing lower wall 408a, the second base inner wall 514b is oriented toward the second housing lower wall 408b, the third base inner wall 514c is oriented toward the third housing lower wall 408c, and the fourth base inner side wall 514d is oriented toward the fourth housing lower side wall 514d. In some examples, the first base inner side wall 514a is substantially parallel relative to the first housing lower side wall 408a, the second base inner side wall 514b is substantially parallel relative to the second housing lower side wall 408b, the third base inner side wall 514c is substantially parallel relative to the third housing lower side wall 408c, and the fourth base inner side wall 514d is substantially parallel relative to the fourth housing lower side wall 408d. In this manner, the base 204 retains the meter 202 within the cavity 502 of the base 204 when the meter 202 becomes misaligned relative to the base 204. For example, the meter 202 can become misaligned relative to the base 204 in response to a respective one of the housing magnets 302 moving out of alignment relative to a respective one of the base magnets 304. For instance, if the meter 202 is bumped such that the polarity of the housing magnets 302 do not repel the polarity of the base magnets 304, the meter 202 is retained within the cavity 502 of the base 204 and does not fall away from the base 204 (e.g., and off the stand 134). For example, when the housing magnets 302 are misaligned relative to the base magnets 304, the lower housing side walls 408 of the meter 202 move in direct contact with the base inner side walls 514 of the base 204.

FIGS. 7-10 illustrate other example metering systems 700-1000 disclosed herein. Many of the components of FIGS. 7-10 are substantially similar or identical to the components described above in connection with FIGS. 1, 2A, 2B, 3, 4A-E, 5A-5F, and 6A-6C. As such, those components will not be described in detail again below. Instead, the interested reader is referred to the above corresponding descriptions for a complete written description of the structure and operation of such components. To facilitate this process, similar or identical reference numbers will be used for like structures in FIGS. 7-10 as used in FIGS. 1, 2A, 2B, 3, 4A-E, 5A-5F, and 6A-6C.

Figure 7:
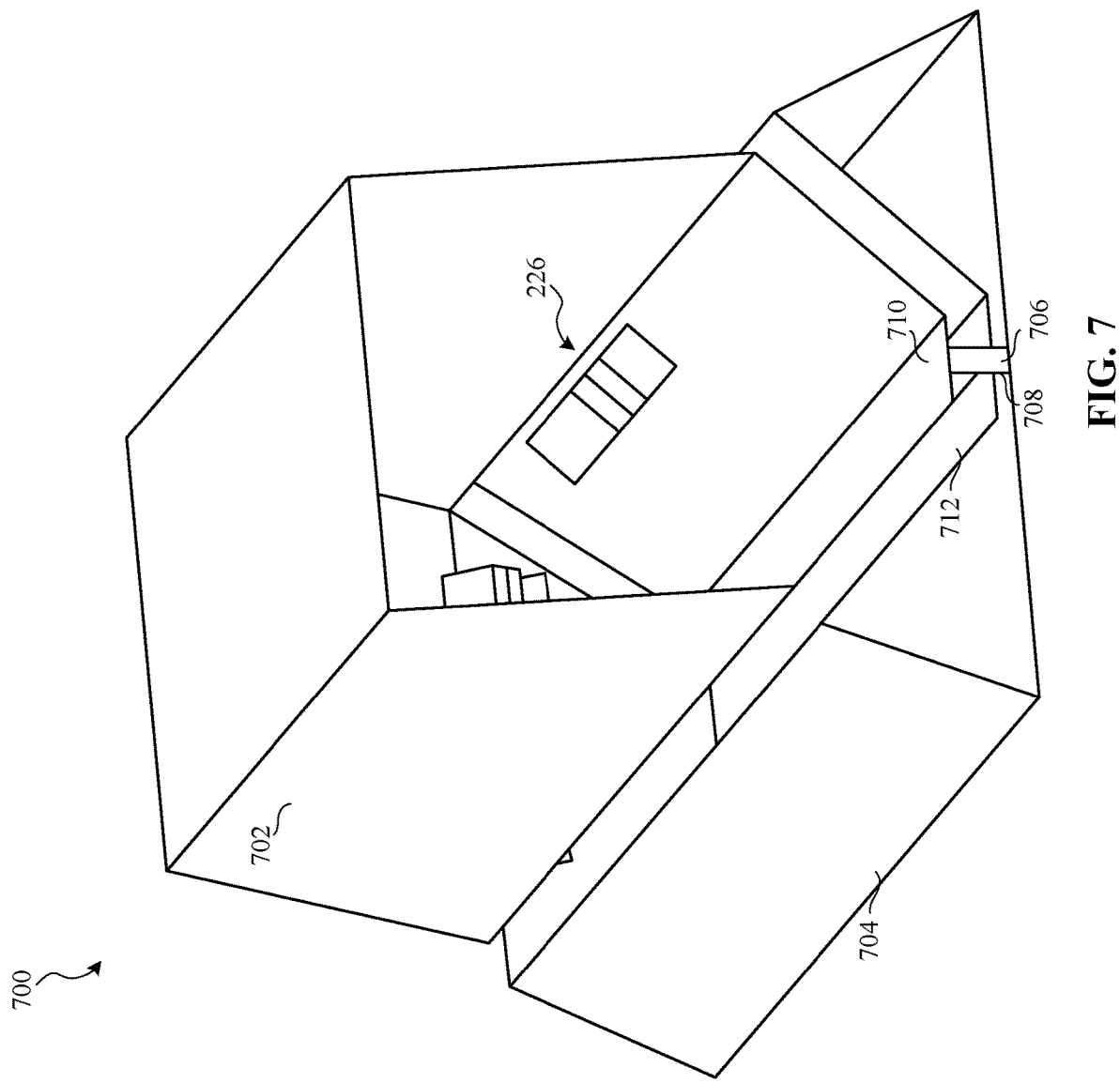

FIG. 7 is another example metering system 700 disclosed herein. The metering system 700 of the illustrated example includes a meter 702, a base 704 and a magnetic levitation system 226. The meter 702 and the base 704 are substantially similar to the meter 202 and the base 204 of FIGS. 1, 2A, 2B, 3, 4A-E, 5A-5F, and 6A-6C. However, the meter 702 of the illustrated example includes a locating pin 706 and the base 704 includes a locating pin aperture 708 to receive the locating pin 706. The locating pin 706 protrudes from a lower surface 710 of the meter 702 and the locating pin aperture 708 is formed in a lower surface 712 of the base 704. In some examples, the meter 702 includes a plurality of locating pins and the base 704 includes a plurality of locating pin apertures to receive corresponding ones of the locating pins. In some examples, the base 704 includes the locating pin 706 and the meter 702 includes the locating pin aperture 708. The locating pin 706 stabilizes and/or centers (e.g., aligns) the meter 702 relative to the base 704. Although the meter 702 levitates relative to the base 704 via the magnetic levitation system 226, the meter 702 is coupled to the base 704 via the locating pin 706. However, the locating pin 706 provides a relatively small travel path for vibrations imparted to the base 704 to travel to the meter 702. Therefore, the vibrations imparted to the meter 702 are negligible and do not affect performance of microphones (e.g., the microphones 210 of FIGS. 2A and 2B) located in the meter 702.

Figure 8:
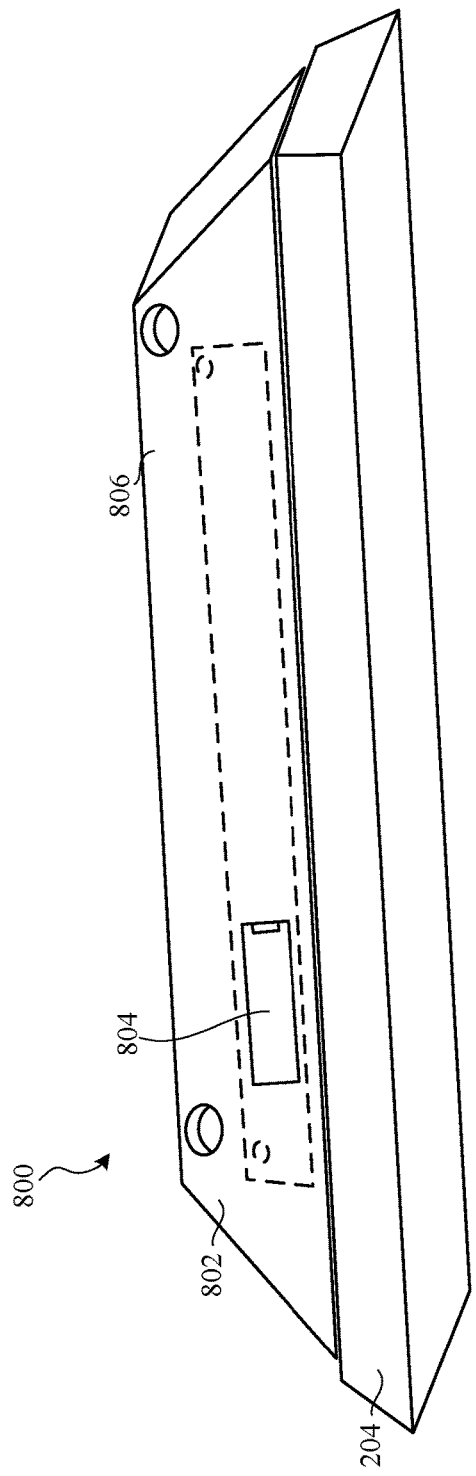

FIG. 8 is another example metering system 800 disclosed herein. The metering system 800 of the illustrated example includes a meter 802 and a base 204. To provide power to the meter 800, the meter 802 of the illustrated example includes a battery (e.g., a rechargeable battery). The battery is accessible via a panel 804 (e.g., a door) removable coupled to a rear surface 208 of the meter 800.

Figure 9:
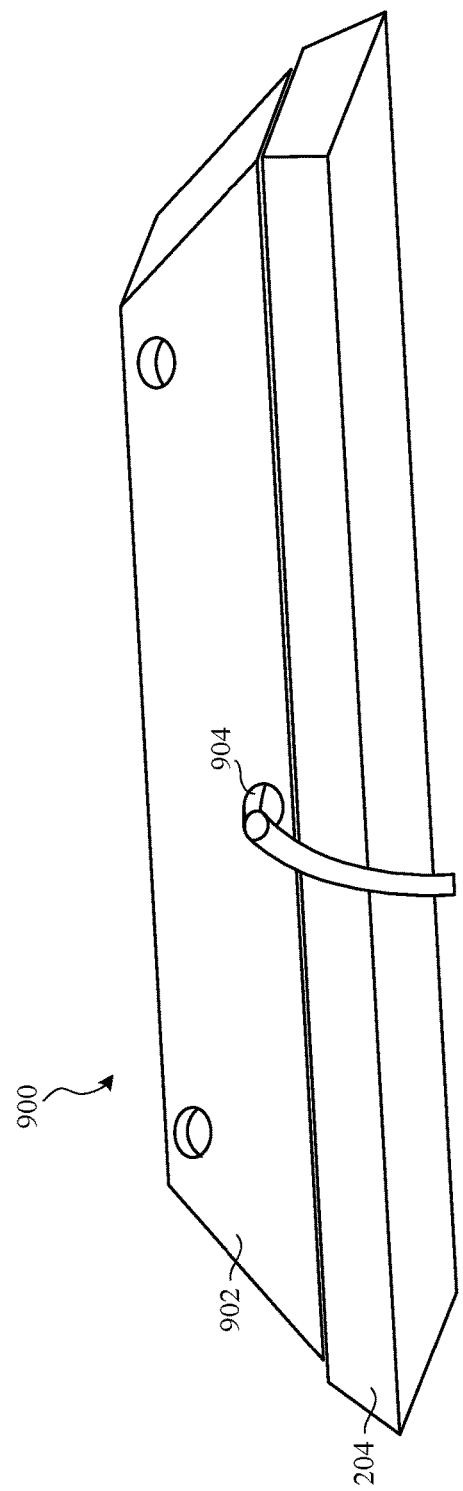

FIG. 9 is another example metering system 900 disclosed herein. The metering system 900 of the illustrated example includes a meter 902 and a base 204. To provide power to the metering system 900, the meter 902 of the illustrated example includes a power cord 904.

In some examples, the metering system disclosed herein can employ wireless powering system. For example, the base 204 can include a power transmitter with a relatively large inductor and the meter 202 includes a receiving inductor to capture power from the power transmitter located in the base 204. In some such examples, the base 204 includes a power cord (e.g., the power cord 904) to couple to a power source (e.g., an wall power outlet).

FIG. 10 is another example metering system 1000 disclosed herein. The metering system 1000 of the illustrated example includes a meter 1002 and a base 1004. The meter 1002 includes a plurality of housing magnets 1006 and the base 1004 includes a plurality of base magnets 1008. The housing magnets 1006 are provided on a lower housing portion 404 of the meter 1002. For example, the housing magnets 1006 are provided on lower portion side walls 1010 (e.g., lower housing side walls 408a-d) and a lower wall portion 1012. The base magnets 1008 are provided are inner side walls 1014 and a lower wall 1016. The housing magnets 1006 and the base magnets 1008 are round magnets and the polarities are oriented to repeal each other to cause the meter 1002 to levitate relative to the base 1004 when the meter 1002 is aligned with the base 1004.

Although each example metering system 102, 700, 800, 900 and 1000 disclosed above have certain features (e.g., sensors), it should be understood that it is not necessary for a particular feature of one example metering system 102, 700, 800, 900 and 1000 to be used exclusively with that example. Instead, any of the features of the example metering systems 102, 700, 800, 900 and 1000 described above and/or depicted in the drawings can be combined with any of the example metering systems 102, 700, 800, 900 and 1000, in addition to or in substitution for any of the other features of those examples. One example's features are not mutually exclusive to another example's features. Instead, the scope of this disclosure encompasses any combination of any of the features. In some examples, a meter disclosed in accordance with the teachings of this disclosure may have a combination of the features of the example metering systems 102, 700, 800, 900 and 1000 disclosed herein.

At least some of the aforementioned examples include one or more features and/or benefits including, but not limited to, the following:

Example 1 includes a metering system for monitoring a media device, the metering system comprising a meter having a display to present indicia associated with a panelist, the meter having a microphone to receive audio output from the media device and circuitry to perform media monitoring, and a base having a cavity to receive at least a portion of the meter, the meter to magnetically levitate relative to the base to decouple the meter from the base.

Example 2 includes the metering system of example 1, wherein the meter is to detach entirely from the base when the meter levitates relative to the base.

Example 3 includes the metering system of example 1, wherein the meter includes a plurality of housing magnets and the base includes a plurality of base magnets, respective ones of the housing magnets align with respective ones of the base magnets, the housing magnets to repel the base magnets to cause the meter to levitate relative to the base.

Example 4 includes the metering system of example 3, wherein the meter and the base form a gap therebetween when the meter levitates relative to the base.

Example 5 includes the metering system of example 4, wherein the gap is approximately between 1 millimeter and 2 millimeters.

Example 6 includes the metering system of example 4, wherein the gap between the meter and the base provides an insulator to dampen vibrations imparted to the base to prevent the microphone from sensing noise generated from the vibrations.

Example 7 includes the metering system of example 1, wherein the base includes a plurality of base inner side walls defining the cavity and the meter includes a plurality of lower housing side walls defining, wherein the base inner side walls define a shape that is complementary to a shape defined by the lower housing side walls.

Example 8 includes the metering system of example 7, wherein the base inner side walls include a first base inner side wall, a second base inner side wall, a third base inner side wall, and a fourth base inner side wall, the meter including a first lower housing side wall, a second lower housing side wall, a third lower housing side wall and a fourth lower housing side wall, wherein the first base inner side wall is oriented toward the first lower housing side wall, the second base inner side wall is oriented toward the second lower housing side wall, the third base inner side wall is oriented toward the third lower housing side wall, and the fourth base inner side wall is oriented toward the fourth lower housing side wall example 9 includes the metering system of example 8, wherein the first base inner side wall is substantially parallel relative to the first lower housing side wall, the second base inner side wall is substantially parallel relative to the second lower housing side wall, the third base inner side wall is substantially parallel relative to the third lower housing side wall, and the fourth base inner side wall is substantially parallel relative to the fourth lower housing side wall.

Example 10 includes a meter comprising a housing, a microphone within the housing to receive audio from a media device and circuitry to perform media monitoring, and a plurality of magnets to align with corresponding base magnets of a base, the plurality of magnets to cause the housing to levitate relative to the base to form an air gap therebetween.

Example 11 includes the meter of example 10, wherein the plurality of magnets are positioned about a perimeter of the housing.

Example 12 includes the meter of example 10, wherein the housing includes a lower portion defined by one or more housing lower side walls, the one or more housing lower side walls to be partially received by a cavity of the base.

Example 13 includes the meter of example 12, wherein the lower portion of the meter includes a first plurality of housing magnets positioned along a perimeter of the lower portion.

Example 14 includes the meter of example 12, wherein the lower portion includes a first housing lower side wall, a second housing lower side wall, a third housing lower side wall and a fourth housing lower side wall, the first housing lower side wall is oriented opposite the second housing lower side wall, and the third housing lower side wall is oriented opposite the fourth housing lower side wall.

Example 15 includes the meter of example 14, wherein the first housing lower side wall includes a first housing magnet and a second housing magnet, the second housing lower side wall includes a third housing magnet and a fourth housing magnet, the third housing lower side wall includes a fifth housing magnet and the fourth housing lower side wall includes a sixth housing magnet.

Example 16 includes a base for use with a media meter, the base comprising a body defining a cavity to receive at least a portion of a media meter, and a plurality of base magnets positioned within the cavity, the base magnets to align with housing magnets of the media meter, the base magnets to repel the housing magnets to cause the media meter to levitate relative to the base to form an air gap therebetween.

Example 17 includes the base of example 16, wherein the base magnets are positioned about a perimeter of the base.

Example 18 includes the base of example 16, wherein the base is to be positioned on a surface that supports a media device.

Example 19 includes the base of example 16, wherein base includes a first base inner side wall, a second base inner side wall, a third base inner side wall and a fourth base inner side wall defining the cavity, the first base inner side wall is oriented opposite the second base inner side wall, and the third base inner side wall is oriented opposite the fourth base inner side wall.

Example 20 includes the base of example 19, wherein the first base inner side wall includes a first base magnet and a second base magnet, the second base inner side wall includes a third base magnet and a fourth base magnet, the third base inner side wall includes a fifth base magnet, and fourth base inner side wall includes a sixth base magnet.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A metering system comprising:
a meter having a display to present indicia associated with a panelist, the meter having a microphone to receive audio output from a media device and circuitry to perform media monitoring; and
a base including a cavity to receive at least a portion of the meter, the meter to magnetically levitate relative to the base to decouple the meter from the base, the base and the meter structured to fix a rotational position of the meter relative to the base when the at least the portion of the meter is received by the cavity of the base and the meter levitates relative to the base.

2. The metering system of claim 1, wherein the meter is to detach entirely from the base when the meter levitates relative to the base to isolate the microphone from the base to reduce degradation of an audio signal received by the microphone when the cavity of the base receives a lower housing of the meter.

3. The metering system of claim 1, wherein meter nests within the cavity of the base to maintain the meter aligned relative to the base when the meter levitates relative to the base.

4. The metering system of claim 1, wherein the meter structured to decouple from the base in response to moving the meter away from the base.

5. The metering system of claim 1, wherein the meter includes a plurality of housing magnets and the base includes a plurality of base magnets, respective ones of the housing magnets align with respective ones of the base magnets, the housing magnets to repel the base magnets to cause the meter to levitate relative to the base.

6. The metering system of claim 5, wherein the meter and the base form a gap therebetween when the meter levitates relative to the base.

7. The metering system of claim 6, wherein the gap between the meter and the base provides an insulator to dampen vibrations imparted to the base to prevent the microphone from sensing noise generated from the vibrations.

8. The metering system of claim 1, wherein the meter including an upper housing and a lower housing, the lower housing having a plurality of lower housing side walls, the lower housing side walls each taper towards a longitudinal axis of the lower housing, the meter including a first lower housing side wall, a second lower housing side wall, a third lower housing side wall, a fourth lower housing side wall, and a lower housing bottom wall.

9. The metering system of claim 8, wherein the base includes a plurality of base inner side walls defining the cavity, the base inner side walls includes a first base inner side wall, a second base inner side wall, a third base inner side wall, a fourth base inner side wall, and a base inner bottom wall, wherein the first base inner side wall is oriented toward the first lower housing side wall, the second base inner side wall is oriented toward the second lower housing side wall, the third base inner side wall is oriented toward the third lower housing side wall, the fourth base inner side wall is oriented toward the fourth lower housing side wall, and the base inner bottom wall is oriented toward the lower housing bottom wall.

10. The metering system of claim 9, wherein the first base inner side wall is substantially parallel relative to the first lower housing side wall, the second base inner side wall is substantially parallel relative to the second lower housing side wall, the third base inner side wall is substantially parallel relative to the third lower housing side wall, and the fourth base inner side wall is substantially parallel relative to the fourth lower housing side wall, and the base inner bottom wall is substantially parallel relative to the lower housing bottom wall.

11. A metering system comprising:
   a meter defining a housing that includes circuitry to perform media monitoring;
   a microphone within the housing of the meter to receive audio from a media device;
   a base separate from the meter and defining a cavity;
   a plurality of housing magnets carried by the meter; and
   a plurality of base magnets carried by the base and oriented toward the cavity, the housing magnets of the meter to align with corresponding base magnets of the base when the meter is located in the cavity of the base, the base magnets to repel the housing magnets, the housing magnets to cause the housing to levitate relative to the base to form an air gap therebetween, the base and the meter structured to restrict rotation of the meter relative to the base when the meter is levitated relative to the base, the meter being capable of instantaneous removal from the base.

12. The metering system of claim 11, wherein the housing magnets are positioned about a perimeter of the housing, and wherein the base magnets are positioned about a perimeter of the base.

13. The metering system of claim 11, wherein the housing includes a lower housing portion and an upper housing portion, the lower housing portion having a convex shape defined by a plurality of housing walls.

14. The metering system of claim 13, wherein the lower housing portion includes at least one of a first housing wall, a second housing wall, a third housing wall, and a fourth housing wall, the first housing wall is oriented opposite the second housing wall, the third housing wall is oriented opposite the fourth housing wall, and wherein the first housing wall includes a first housing magnet and a second housing magnet, the second housing wall includes a third housing magnet and a fourth housing magnet, the third housing wall includes a fifth housing magnet and the fourth housing wall includes a sixth housing magnet.

15. The metering system of claim 14, wherein the base includes a plurality of inner base walls that define the cavity, the cavity having a concave shape, the inner base walls including at least a first base wall, a second base wall, a third base wall and a fourth base wall, the first base wall is oriented opposite the second base wall, and the third base wall is oriented opposite the fourth base wall, and wherein the first base wall includes a first base magnet and a second base magnet, the second base wall includes a third base magnet and a fourth base magnet, the third base wall includes a fifth base magnet, and fourth base wall includes a sixth base magnet.

16. The metering system of claim 15, wherein when the meter is coupled to the base, the first housing wall is oriented toward the first base wall, the second housing wall is oriented toward the second base wall, the third housing wall is oriented toward the third base wall, and the fourth housing wall is oriented toward the fourth base wall.

17. A metering system for monitoring a media device, the metering system comprising:
   a meter having a display to present indicia associated with a panelist, the meter having a microphone to receive audio output from the media device and circuitry to perform media monitoring, the meter having a housing defining a projection; and
   a base defining a cavity to receive the projection of the meter, the meter to magnetically levitate relative to the base to decouple the meter from the base and isolate the microphone from the base to reduce degradation of an audio signal received by the microphone when the projection of the meter is received by the base, the base and the meter structured to fix a rotational position of the meter relative to the base in response to at least one of the meter coupled to the base or the meter levitating relative to the base.

18. The metering system of claim 17, wherein the meter includes a plurality of housing magnets and the base includes a plurality of base magnets, respective ones of the housing magnets align with respective ones of the base magnets, the housing magnets to repel the base magnets to cause the meter to levitate relative to the base.

19. The metering system of claim 17, wherein the meter is structured to decouple from the base in response to a lifting forces applied to the meter in a direction away from the base.

20. The metering system of claim 17, wherein the meter and the base form a gap therebetween when the projection is received by the base and the meter levitates relative to the base.

* * * * *

UNITED STATES PATENT AND TRADEMARK OFFICE
CERTIFICATE OF CORRECTION

PATENT NO. : 11,564,006 B2
APPLICATION NO. : 17/452542
DATED : January 24, 2023
INVENTOR(S) : Barbis et al.

Page 1 of 1

It is certified that error appears in the above-identified patent and that said Letters Patent is hereby corrected as shown below:

On the Title Page

In Item (63), under "Related U.S. Application Data", delete "PCT/US2020/049898, filed on Sep. 9, 2019," and insert --"PCT/US2020/049898, filed on Sep. 9, 2020"--.

Signed and Sealed this
Eighth Day of August, 2023

Katherine Kelly Vidal
*Director of the United States Patent and Trademark Office*